US012204504B2

(12) United States Patent
Morton et al.

(10) Patent No.: US 12,204,504 B2
(45) Date of Patent: *Jan. 21, 2025

(54) SYSTEM AND METHOD FOR IDENTIFYING AND ENABLING DATA MARKETPLACE PURCHASES AND SALES OF INTEGRATED DATA

(71) Applicant: BOOMI, LP, Chesterbrook, PA (US)

(72) Inventors: Michael J. Morton, Morrisville, NC (US); Steve J. Todd, Center Conway, NH (US); Richard A. Backhouse, Apex, NC (US)

(73) Assignee: BOOMI, LP, Chesterbrook, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,322

(22) Filed: Nov. 20, 2023

(65) Prior Publication Data

US 2024/0087000 A1 Mar. 14, 2024

Related U.S. Application Data

(63) Continuation of application No. 16/942,763, filed on Jul. 30, 2020, now Pat. No. 11,823,252.

(51) Int. Cl.
*G06F 16/00* (2019.01)
*G06F 16/21* (2019.01)
*G06F 16/84* (2019.01)
*G06N 3/049* (2023.01)
*G06Q 30/0601* (2023.01)
(Continued)

(52) U.S. Cl.
CPC ............ *G06F 16/214* (2019.01); *G06F 16/86* (2019.01); *G06N 3/049* (2013.01); *G06Q 30/0641* (2013.01); *G06F 16/953* (2019.01); *G06N 3/02* (2013.01)

(58) Field of Classification Search
CPC ...... G06F 16/214; G06F 16/86; G06F 16/953; G06N 3/02; G06N 3/049; G06Q 30/0641
See application file for complete search history.

(56) References Cited

U.S. PATENT DOCUMENTS

2005/0066306 A1 3/2005 Diab
2006/0136466 A1 6/2006 Weiner
(Continued)

*Primary Examiner* — Diedra McQuitery
(74) *Attorney, Agent, or Firm* — Prol Intellectual Property Law, PLLC; H. Kenneth Prol

(57) ABSTRACT

A method of identifying and enabling a data marketplace system transaction may comprise receiving an enterprise user object map defining a dataset field name and storage location for a dataset to be migrated pursuant to a user data integration process modeled by a user with a plurality of visual elements, identifying a data marketplace domain classification for the dataset to be migrated based on the enterprise user object map, querying a data marketplace application programming interface (API) to determine that it provides a marketplace for datasets meeting the data marketplace domain classification, generating a dataset sale integration process for transmitting the dataset of the data marketplace domain classification selected by the user for sale from a storage location defined by the user data integration process to a location defined by the data marketplace API, and automatically transmitting the dataset of the data marketplace domain classification to a purchaser.

20 Claims, 13 Drawing Sheets

(51) Int. Cl.
    *G06F 16/953*     (2019.01)
    *G06N 3/02*     (2006.01)

(56) References Cited

U.S. PATENT DOCUMENTS

| | | |
|---|---|---|
| 2007/0118399 A1 | 5/2007 | Avanish |
| 2013/0031117 A1 | 1/2013 | Mandelstein |
| 2016/0171115 A1* | 6/2016 | Jheeta ............... G06F 16/24575 707/723 |
| 2018/0137560 A1* | 5/2018 | Chopra .................. G06F 9/451 |
| 2019/0007381 A1 | 1/2019 | Isaacson |
| 2019/0122246 A1* | 4/2019 | Shiffert .............. G06Q 30/0269 |
| 2019/0340516 A1* | 11/2019 | Kumar .................... G06N 5/02 |
| 2020/0184556 A1 | 6/2020 | Cella |
| 2022/0058631 A1* | 2/2022 | Yantis .................... G06Q 20/40 |
| 2023/0043702 A1 | 2/2023 | Sells |

* cited by examiner

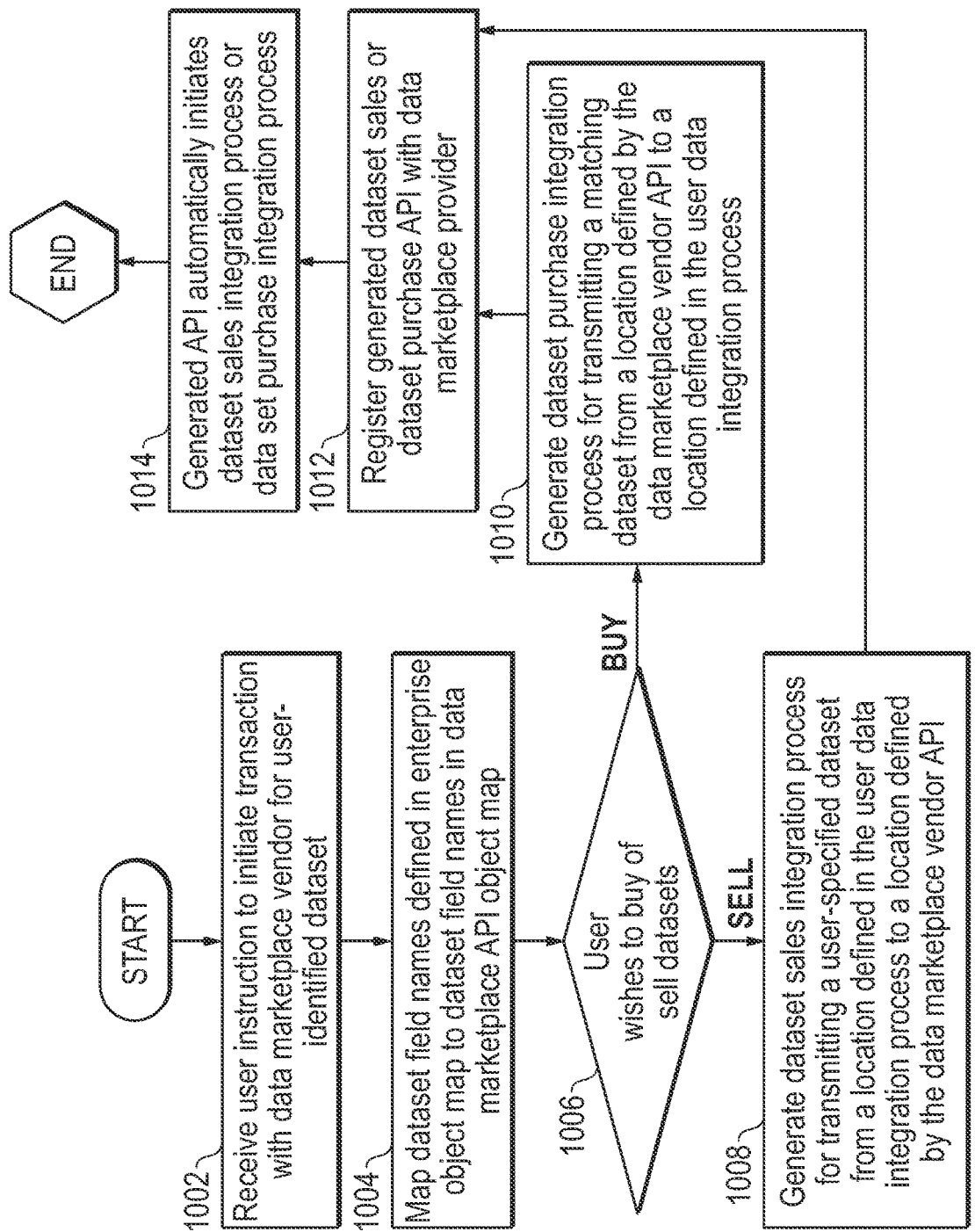

SYSTEM AND METHOD FOR IDENTIFYING AND ENABLING DATA MARKETPLACE PURCHASES AND SALES OF INTEGRATED DATA

This application is a continuation of prior application Ser. No. 16/942,763, entitled "SYSTEM AND METHOD FOR IDENTIFYING AND ENABLING DATA MARKETPLACE PURCHASES AND SALES OF INTEGRATED DATA," filed on Jul. 30, 2020, which is assigned to the current assignee hereof and is incorporated herein by reference in its entirety.

FIELD OF THE DISCLOSURE

The present disclosure relates generally to a system and method for deploying and executing customized data integration processes. More specifically, the present disclosure relates to identifying and enabling sales of data migrated pursuant to such customized data integration processes, or purchasing similar data.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which:

FIG. 10 is a flow diagram illustrating a method of automatically enabling sales or purchase of datasets according to an embodiment of the present disclosure.

The use of the same reference symbols in different drawings may indicate similar or identical items.

DETAILED DESCRIPTION

Figure 1:
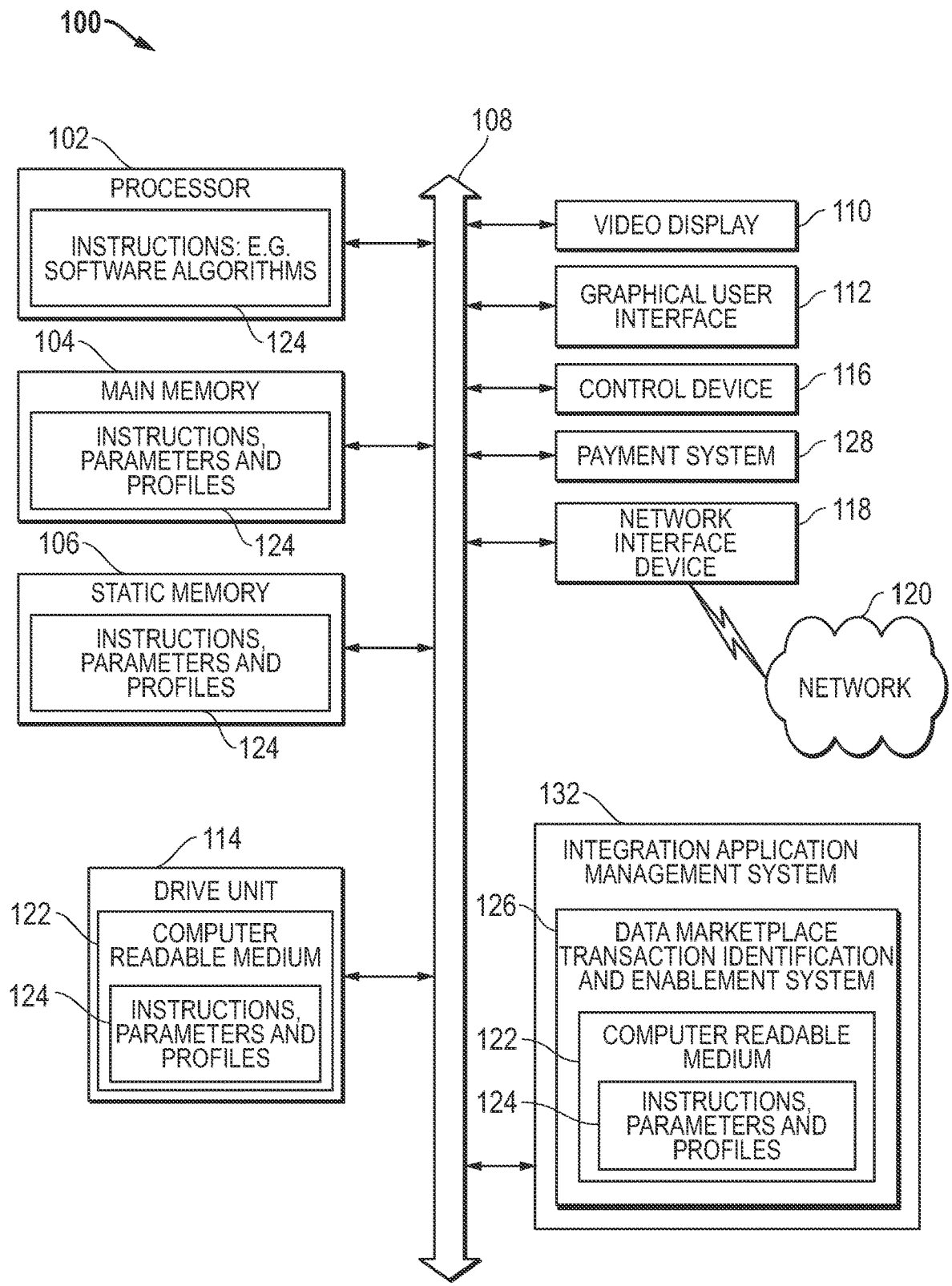
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Current methods of transacting business between or among a plurality of business entities involve the use of multiple software applications, application programming interfaces (APIs), or integration processes to transfer shared data among the plurality of businesses. Each of these business entities may use a different structure or method for receiving and storing the same type of information, causing each of these multiple applications, APIs, or integration processes to be customized to a particular business or group of businesses among which the same data may be shared. Embodiments of the present disclosure allow businesses to perform such necessary customization using a graphical user interface (GUI) that models each step of the data sharing among the various businesses, without having to learn the underlying computer language that will execute these steps. Such a GUI in embodiments described herein may also track the different ways in which such shared data is organized and stored at each of the various businesses pursuant to such modeled, customized integration processes.

With the advent of the Internet of Things (IoT), and "big data," the volume of data collected and shared pursuant to these modeled, customized integration processes has grown exponentially, and will continue to do so well into the future. When leveraged optimally, such data may be used by various businesses or industries to streamline production, minimize costs, and support other optimization and prediction activities (e.g., predicting consumer trends, or designing hardware maintenance timelines). However, most businesses significantly underutilize the data they gather, and fewer utilize data available from other businesses. Such underutilization is due in large part to a lack of tools available to quickly and accurately identify, categorize, and access the large volumes of data being transmitted among various businesses. Developing such a tool may open a new revenue stream for businesses, based entirely upon leveraging the value of such data.

As described above, embodiments of this application may track the different ways in which such shared data is organized and stored at each of the various businesses during integration processes. Leveraging this tracking information, embodiments of the present disclosure may identify opportunities for the sale of such data, or purchasing of similar data through, one or more online data marketplaces. In other words, the ways in which embodiments of the present application track the migration of data pursuant to user-modeled integration processes occurring as part of these users' normal course of business may serve the dual purpose of data mining to determine if there is a market for the sale of such data. Further, embodiments of the present disclosure may automatically generate and execute new integration processes to facilitate such sales or purchases, should the user wish to proceed in that direction.

Conventional software development and distribution models have involved development of an executable software application, and distribution of a computer-readable medium, or distribution via download of the application from the worldwide web to an end user. Upon receipt of the downloaded application, the end user executes installation files to install the executable software application on the user's personal computer (PC), or other information handling system. When the software is initially executed, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might sometimes be satisfactory for individual end users, it is undesirable in sophisticated computing environments.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. In many instances, these disparate computing networks, enterprises, or systems are located in a variety of different countries around the world. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system, and a seller's invoicing system. Some of these different software applications/systems may be cloud-based, with physical servers located in several different countries, cities, or other geographical locations around the world. As data is integrated between and among these cloud-based platforms, datasets may be stored (e.g., temporarily or indefinitely) in some form at physical servers in these various geographical locations.

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are available in the market today. These applications are typically purchased from software vendors and installed on a computerized system owned and maintained by the business, in this example, the buyer. The seller will have a similar/complementary software application on its system, so that the information exchange may be completely automated in both directions. These applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems in identical, generic form. The software application is then installed within a specific enterprise's computing network (which may include data centers, etc., physically located outside of an enterprises' physical boundaries). After the generic application is installed, it is then configured and customized for a specific trading partner after which it is ready for execution to exchange data between the specific trading partner and the enterprise. For example, Walmart® may provide on its website specifications of how electronic data such as Purchase Orders and Invoices must be formatted for electronic data communication with Walmart, and how that data should be communicated with Walmart®. A supplier/enterprise is then responsible for finding a generic, commercially available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website using a specially configured integration process flow modeling user interface to visually model a business integration process via a flowcharting process, using only a web browser interface. During such a modeling process, the user would select from a predetermined set of process-representing visual elements that are stored on a remote server, such as the web server. By way of an example, the integration process could enable a bi-directional exchange of data between internal applications of an enterprise, between internal enterprise applications and external trading partners, or between internal enterprise applications and applications running external to the enterprise.

A customized data integration software application creation system in an embodiment may allow a user to create a customized data integration software application by modeling a data integration process flow using a graphical user interface. A modeled data integration process flow in embodiments of the present disclosure may model actions taken on data elements pursuant to executable code instructions without displaying the code instructions themselves. In such a way, the graphical user interface may allow a user to understand the high-level summary of what executable code instructions achieve, without having to read or understand the code instructions themselves. Similarly, by allowing a user to insert visual elements representing portions of an integration process into the modeled data integration process flow displayed on the graphical user interface, embodiments of the present disclosure allow a user to identify what she wants executable code instructions to achieve without having to write such executable code instructions.

Once a user has chosen what she wants an executable code instruction to achieve in embodiments herein, the code instructions capable of achieving such a task may be generated. Code instructions for achieving a task can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have a high level knowledge of computer science. Such open-standard, human-readable, data structure formats include extensible markup language (XML) and JavaScript Object Notification (JSON). Because code instructions adhering to these open-standard formats are more easily understood by non-specialists, many companies have moved to the use of code instructions adhering to these formats in constructing their data repository structures and controlling the ways in which data in these repositories may be accessed by both internal and external agents. In order to execute code instructions for accessing data at such a repository during a business integration process, the code instructions of the business integration process in some embodiments herein may be written in accordance with the same open-standard formats or other known, or later-developed standard formats.

In addition to the advent of open-standard, human-readable, machine-executable code instructions, the advent of application programming interfaces (APIs) designed using such open-standard code instructions or proprietary schemas have also streamlined the methods of communication between various software components. An API may operate to communicate with a backend application to identify an action to be taken on a dataset that the backend application manages, or which is being transmitted for management to the backend application. Such an action and convention for identifying the dataset or its location may vary among APIs and their backend applications. For example, datasets may be modeled according to user-supplied or proprietary definitions. Each dataset may contain a user-defined or proprietary dataset field name, which may describe a type of information. Each user-defined or proprietary dataset field name may be associated with a dataset field value. In other words, datasets may be modeled using a fieldname:value pairing. For example, a given API dataset schema for a customer named John Smith may include a first dataset field name "f_name" paired with a first dataset field value "John," and a second dataset field name "l_name" paired with a second dataset field value "Smith."

In embodiments described herein, multiple APIs, databases, or backend applications accessed via a single integration process may operate according to differing coding languages, dataset structures, dataset field naming conventions, schemas, or standards. Different coding languages or differing APIs may use different ways of describing routines, data structures, object classes, variables, or remote calls that may be invoked and/or handled during business integration processes that involve dataset field values managed by databases or by the backend applications such APIs serve. For example, in comparison to the API referenced directly above storing a fieldname/value of "f_name"/"John," a dataset for the same customer in a separate API may use a first dataset field name "FirstName." Thus, a single dataset field value (e.g., "John") may be described in a single integration process using a plurality of dataset field names (e.g., "f_name" or "FirstName"), each adhering to the naming conventions set by databases, the APIs, applications, enterprises, or trading partners through or among which the dataset field value is programmed to integrate.

In embodiments described herein, an object map graphical user interface may be used to map relationships between different dataset field names for the same dataset field value. For example, a user may model an integration process to access a dataset having a field name "f_name" from a first location, and transmit the dataset field value (e.g., "John") associated with the dataset field name "f_name" to a second location. The second location may use a different schema for storing first name information, such as labeling such information using a dataset field name "FirstName" instead of "f_name." In such a scenario, an object map graphical user interface in embodiments described herein may display a link between the dataset having a field name "f_name" at the first location and the dataset having a field name "FirstName" at the second location. Such a link may indicate the dataset field value associated with the field name "f_name" at the first location may be stored, pursuant to the user-modeled integration process, with the dataset field name "FirstName" at the second location.

As described herein, most businesses significantly under-utilize the data they gather and share via these software applications, APIs, and integration processes, because of a lack of tools available to quickly and accurately identify, categorize, and access the large volumes of data being transmitted among various businesses. Embodiments of this application may leverage the mapping and linking of various datasets across various locations to identify opportunities for the sale of such data, or purchasing of similar data through one or more online data marketplaces. For example, a data marketplace transaction identification and enablement system in embodiments described herein may automatically search one or more data marketplaces offering datasets for purchase or trade to determine whether the user's data may be offered for sale, or whether the marketplace offers data similar to the user's data for purchase. Such a search may involve searching across similar dataset field names, or searching based on the industry in which the user may be transacting business. The user's industry in embodiments may be determined based on analysis via a neural network of the metadata associated with user-modeled integration processes or object maps.

Further, embodiments of the present disclosure may automatically generate and execute new integration processes to facilitate such sales or purchases, should the user wish to proceed in that direction. The data marketplace transaction identification and enablement system in embodiments described herein may notify a user of an opportunity for sale of specifically identified datasets being transmitted pursuant to a user-modeled integration process, or of an opportunity for purchase of similar datasets via the data marketplace. The user may also be prompted to pursue such an opportunity in embodiments described herein, thus initiating an automatic generation via the data marketplace transaction identification and enablement system of an integration process for completing such a transaction for sale or purchase of matched data.

For example, the data marketplace transaction identification and enablement system in an embodiment in which the user wishes to sell data may determine the location at which the user is storing datasets to be transacted, and the structure or schema for such storage, as well as the location, structure, and schema for storage of the datasets to be transacted at the data marketplace. In such an embodiment, the data marketplace transaction identification and enablement system may then generate an API for execution of an integration process designed to convert user-identified datasets from the user's schema to the data marketplace schema and transmit the converted datasets to the data marketplace via the data marketplace API.

As another example, the data marketplace transaction identification and enablement system in an embodiment in which the user wishes to purchase similar data may determine the location at which the user would store such datasets to be transacted, as well as the structure or schema for such storage, and the location, structure, and schema for storage of such datasets at the data marketplace. In such an embodiment, the data marketplace transaction identification and enablement system may then generate an API for execution of an integration process designed to receive the datasets to be transacted from the data marketplace, convert the received datasets from the data marketplace schema to the user's schema, and store the converted datasets at a user defined location. In both these examples, the data marketplace transaction identification and enablement system may register the automatically generated API with the data marketplace API, and automatically execute the integration processes thus designed. In such a way, the data marketplace transaction identification and enablement system in embodiments described herein may identify and automatically enable the sale or purchase of datasets based on metadata associated with user-modeled integration processes.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. Such an information handling system 100 in an embodiment may supply power to one or more systems or other hardware via alternating current (A/C) power, or via an operably attached battery power source. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the data marketplace transaction identification and enablement system 126, or the integration application management system 132 that may operate on servers or systems, remote data centers, or on-box in individual client information handling systems such as a local display device, or a remote display device, according to various embodiments herein. In some embodiments, it is understood any or all portions of code 124 for the data marketplace transaction identification and enablement system 126, or the integration application management system 132 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the data marketplace transaction identification and enablement system 126, or the integration application management system 132 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the data marketplace transaction identification and enablement system 126, or the integration application management system 132. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, camera, fingerprint scanner, retinal scanner, face recognition device, voice recognition device, or gesture or touch screen input. Video display 100 may be used for a data marketplace interface GUI in example embodiments herein.

The information handling system 100 may further include a graphical user interface 112 supported and displayed via video display 110. The graphical user interface 112 in an embodiment may provide a visual designer environment permitting a user to define process flows between applications/systems, such as between trading partner and enterprise systems, and to model a customized business integration process. The graphical user interface 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the structure or schema of a particular dataset to be sent or received. The providing of this input by the user results in the system's receipt of such user-provided information as an integration process data profile code set.

The graphical user interface 112 in some embodiments may further generate or display a mapping between structures and schemas of a first dataset location and structures and schemas of a second dataset location. For example, such a graphical user interface 112 may link a dataset field name for a given dataset field value as stored at a first location to a different dataset field name under which the same dataset field value may be stored at a second location pursuant to the user-modeled integration process. In some embodiments such a mapping may be performed automatically by the integration application management system 132, the data marketplace transaction identification and enablement system 126 or other agents within system 100 (not shown), based on information provided by the user as an integration process data profile. In other embodiments, the user may generate such links and mappings directly via the graphical user interface 112.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), proprietary APIs (e.g., for SalesForce™ or Oracle's NetSuite™), or an API adhering to a known open source specification (e.g., Swagger™) may enable application programs 124 to interact or integrate operations with one another.

In an example of the present disclosure, instructions 124 may execute software for identifying opportunities for, and automatically enabling execution of sales of datasets migrated pursuant to user-modeled integration processes, or purchases of similar datasets via third-party data marketplace vendors. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, and the data marketplace transaction identification and enablement system 126, or the integration application management system 132 may include a computer-readable medium 122 such as a magnetic disk, or a solid-state disk in an example embodiment. The computer-readable medium of the memory 104, storage devices 106 and 114, the data marketplace transaction identification and enablement system 126, or the integration application management system 132 may store one or more sets of instructions 124, such as software code corresponding to the present disclosure.

The disk drive unit 114, static memory 106, and computer readable medium 122 of the data marketplace transaction identification and enablement system 126, or the integration application management system 132 also contain space for data storage such as an information handling system for managing locations of executions of customized integration processes in endpoint storage locations. Object models, integration process metadata, connector code sets, and trading partner code sets may also be stored in part in the disk drive unit 114, static memory 106, or computer readable medium 122 of the data marketplace transaction identification and enablement system 126, or the integration application management system 132 in an embodiment. In other embodiments, data profile code sets, and run-time engines may also be stored in part or in full in the disk drive unit 114, static memory 106, or computer readable medium 122 of the data marketplace transaction identification and enablement system 126, or the integration application management system 132. Further, the instructions 124 of the data marketplace transaction identification and enablement system 126, or the integration application management system 132 may embody one or more of the methods or logic as described herein.

In a particular embodiment, the instructions, parameters, and profiles 124, and the data marketplace transaction identification and enablement system 126, or the integration application management system 132 may reside completely, or at least partially, within the main memory 104, the static memory 106, disk drive 114, and/or within the processor 102 during execution by the information handling system 100. Software applications may be stored in static memory 106, disk drive 114, the data marketplace transaction identification and enablement system 126, or the integration application management system 132.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof, and may communicate via a wired connection or wirelessly. For example, network interface device 118 may communicate directly with the network 120, via wired or wireless connection, in order to access the internet, or to communicate with external agents. More specifically, the information handling system 100 may communicate via the network interface device 118 and the network 120 with one or more user enterprise system/networks, those users' trading partners, and various APIs including a data marketplace API operating to facilitate sales of datasets or APIs operating to facilitate the transfer of money or credits pursuant to such sales. The information handling system 100 may also include a payment system 128 in an embodiment that operates to track, receive, transfer, or implement the receipt or transfer of electronic funds pursuant to user-selected sales or purchases made pursuant to embodiments described herein.

The data marketplace transaction identification and enablement system 126, or the integration application management system 132 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the data marketplace transaction identification and enablement system 126, or the integration application management system 132, which may be operably connected to the bus 108. The data marketplace transaction identification and enablement system 126 is discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the data marketplace transaction identification and enablement system 126, or the integration application management system 132 and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
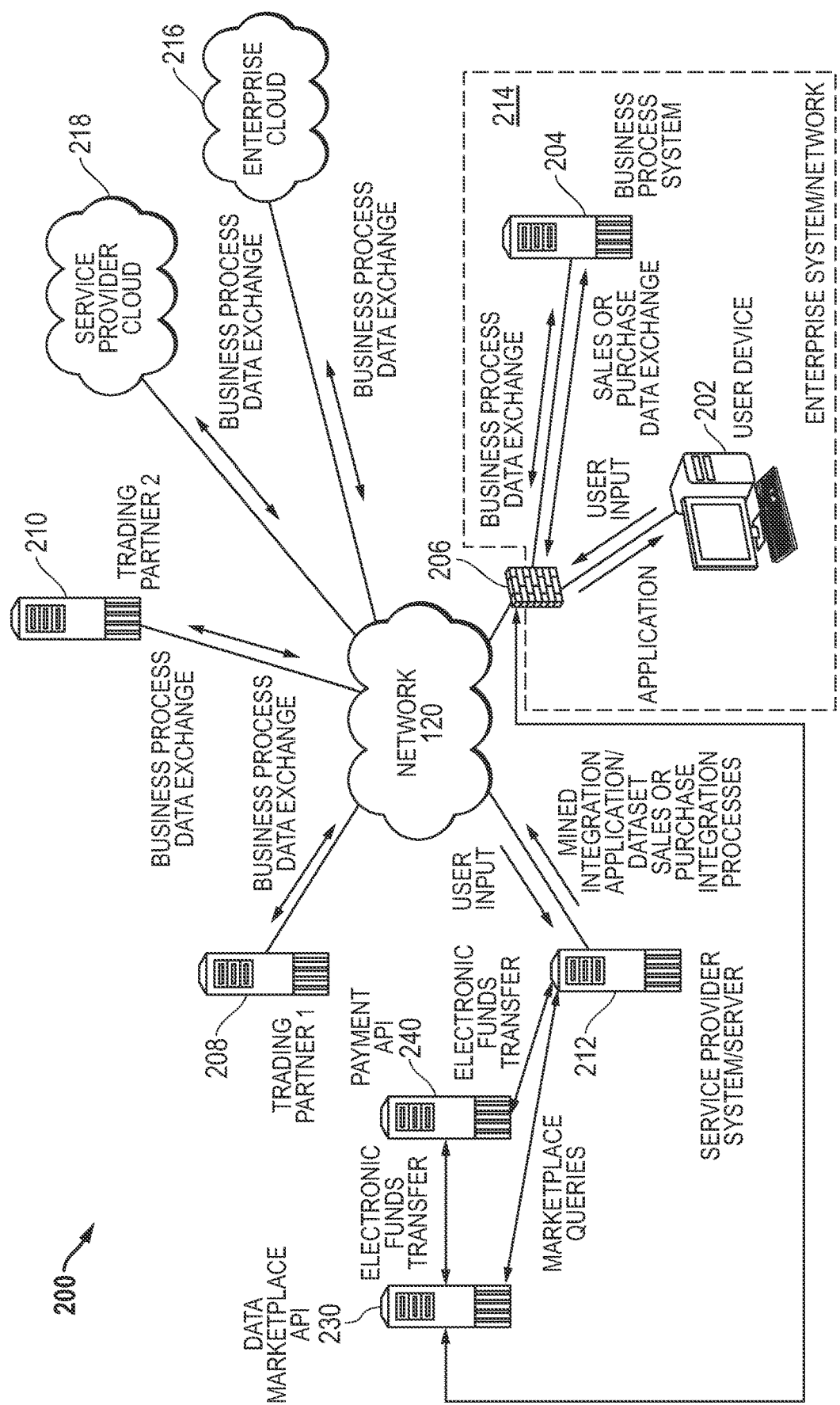
FIG. 2 is a block diagram illustrating a simplified integration network according to an embodiment of the present disclosure.

FIG. 2 is a graphical diagram illustrating a simplified integration network 200 including a service provider system/server 212 and an enterprise system/network 214 in an embodiment according to the present disclosure. The service provider system/server 212 in an embodiment may operate to provide three primary functions in an embodiment. First, the service provider system/server 212 may generate an integration application with code instructions for executing a business process data exchange (e.g., integration process) modeled by the user within an enterprise system/network 214. As described herein, the service provider system/server 212 may automate this process based on high-level user input indicating what the integration process should achieve, in such a way that negates the need for the user within the enterprise system/network to learn and write the code instructions for the integration process.

Second, the service provider system/server 212 may identify and automate sales or purchases of datasets via a data marketplace API 230 in an embodiment. The service provider system/server 212 may mine the data migrated pursuant to this user-modeled business process data exchange, based on the user input provided to generate the integration application. The service provider system/server 212 may then communicate with a data marketplace API 230 to determine whether there is a market for the sale of such mined data, or whether data similar to the mined data is available for the purchase by the enterprise system/network 214. A user within the enterprise system/network 214 may then be prompted to identify one or more datasets migrated pursuant to the user-modeled business process data exchange the user wishes to sell via the data marketplace API 230, or to identify one or more datasets similar to those migrated datasets the user wishes to purchase via the data marketplace API 230. The service provider system/server 212 in an embodiment may then automatically generate code instructions for a sales integration process for transferring datasets from the enterprise system/network 214 to the data marketplace API 230, or for a purchase integration process for transferring datasets from the data marketplace API 230 to the enterprise system/network 214.

Third, the service provider system/server 212 in an embodiment may communicate with a payment API 240 or directly with a financial institution for the transfer of electronic funds. For example, the service provider system/server 212 may facilitate the transfer of electronic funds to the payment API 240 for the purchase of datasets via the data marketplace API 230 on behalf of the user enterprise system/network 214. As another example, the service provider system/server 212 may facilitate the receipt of electronic funds from the payment API 240 for the sale of datasets via the data marketplace API 230 on behalf of the user enterprise system/network 214.

Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, SalesForce's™ Customer Relationship Management (CRM) Platform, Oracle's™ Netsuite Enterprise Resource Planning (ERP) Platform, Infor's™ Warehouse Management Software (WMS) Application, or many other types of databases.

In an embodiment, the integration network 200 may further include trading partners 208 and 210 operating conventional hardware and software for receiving and/or transmitting data relating to business-to-business transactions. For example, Walmart® may operate trading partner system 208 to allow for issuance of purchase orders to suppliers, such as the enterprise 214, and to receive invoices from suppliers, such as the enterprise 214, in electronic data form as part of electronic data exchange processes. Electronic data exchange process in an embodiment may include data exchange via the world wide web. In other embodiments, electronic data exchange processes may include data exchange via File Transfer Protocol (FTP) or Secure File Transfer Protocol (SFTP).

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214. The service provider system/server 212 in an embodiment may host an integration process-modeling user interface in an embodiment. Such an integration process-modeling user interface may allow a user to model an integration process including one or more sub-processes for data integration through a business process data exchange between an enterprise system/network 214 and outside entities or between multiple applications operating at the business process system 204. The integration process modeled in the integration process-modeling user interface in an embodiment may be a single business process data exchange shown in FIG. 2, or may include several business process data exchanges shown in FIG. 2. For example, the enterprise system/network 214 may be involved in a business process data exchange via network 120 with a trading partner 1, and/or a trading partner 2. In other example embodiments, the enterprise system/network 214 may be involved in a business process data exchange via network 120 with a service provider located in the cloud 218, and/or an enterprise cloud location 216. For example, one or more applications between which a dataset field value may be transferred, according to embodiments described herein, may be located remotely from the enterprise system 214, at a service provider cloud location 218, or an enterprise cloud location 216.

The user device 202 may access an integration process-modeling user interface in an embodiment to model one or more business process data exchanges via network 120 within an integration process by adding one or more connector integration elements or code sets to an integration process flow. These connector integration elements in an embodiment may model the ways in which a user wishes data to be accessed, moved, and/or manipulated during the one or more business process data exchanges. Each connector element the user adds to the integration process flow diagram in an embodiment may be associated with a predefined subset of code instructions stored at the service provider systems/server 212. Upon the user modeling the integration process, the service provide system/server 212 in an embodiment may generate a run-time engine capable of executing the pre-defined subsets of code instructions represented by the connector integration elements chosen by the user. The service provider system/server 212 in such an embodiment may then transmit the runtime engine and the pre-defined subsets of code instructions to the user enterprise system/network 214. The user device 202 or the business process system 204 in such an embodiment may then engage the runtime engine to execute the subsets of code instructions in the order defined by the modeled flow of the connector integration elements given in the integration process flow diagram, from behind the enterprise system/network firewall 206. In such a way, an integration process may be executed without the user having to access, read, or write the code instructions of such an integration process.

In other aspects of an embodiment, a user may initiate a business process data exchange between one cloud service provider 218 and one cloud enterprise 216, between multiple cloud service providers 218 with which the enterprise system 214 has an account, or between multiple cloud enterprise accounts 216. For example, enterprise system 214 may have an account with multiple cloud-based service providers 218, including a cloud-based SalesForce™ CRM account and a cloud-based Oracle™ Netsuite™ account. In such an embodiment, the enterprise system 214 may initiate business process data exchanges between itself, the SalesForce™ CRM service provider and the Oracle™ Netsuite service provider.

The service provider system/server 212 may mine the data migrated pursuant to this user-modeled business process data exchange, based on the user input provided to generate the integration application. The service provider system/server 212 may then transmit and receive responses to one or more marketplace queries. For example, the service provider system/server 212 in an embodiment may query the data marketplace API 230 to determine whether it currently offers for sale any datasets matching one or more dataset field names for datasets migrated pursuant to the user-modeled business process data exchange. In another example embodiment, the service provider system/server may categorize the datasets migrated pursuant to the user-modeled business process data exchange by domain or industry. The service provider system/server 212 may then query the data marketplace API 230 to determine whether it offers datasets within this domain or industry for sale.

Through such queries, the service provider system/server 212 may determine whether there is a market for the sale of datasets transmitted pursuant to the business process data exchange, or whether datasets similar to those datasets transmitted pursuant to the business process data exchange are available for purchase by the user enterprise system/network 214. If datasets are available for purchase by the enterprise system/network 214 in an embodiment, the service provider system/server may notify the user of these datasets available for purchase. If there is a marketplace for sale of the datasets transferred pursuant to the business process data exchange, the service provider system/server 212 may prompt the user to identify which of the datasets transmitted pursuant to the business process data exchange to offer for sale via the data marketplace API 230.

Upon user identification of datasets transmitted through the business process data exchange to offer for sale, the service provider system/server 212 in an embodiment may then automatically generate code instructions for a sales integration process. In an embodiment, such a sales integration process may be transmitted to the enterprise system/network 214 for execution behind the firewall 206 to transfer datasets from the enterprise system/network 214 to the data marketplace API 230. Upon identification of similar datasets to purchase, the service provider system/server 212 in an embodiment may then automatically generate code instructions for a purchase integration process. In an embodiment, such a purchase integration process may be transmitted to the enterprise system/network 214 for execution behind the firewall 206 to transfer datasets from the data marketplace API 230 to the enterprise system/network 214.

The service provider system/server 212 in an embodiment may also communicate with a payment API 240 for the transfer of electronic funds pursuant to the sales or purchases occurring between the data marketplace API 230 and the enterprise system/network 214. For example, the service provider system/server 212 may facilitate the transfer of electronic funds to the payment API 240 for the purchase of datasets via the data marketplace API 230 on behalf of the user enterprise system/network 214. As another example, the service provider system/server 212 may facilitate the receipt of electronic funds from the payment API 240 for the sale of datasets via the data marketplace API 230 on behalf of the user enterprise system/network 214. In other embodiments, the transfer of electronic funds may occur directly between the user enterprise system/network 214 and the payment API 240 or the data marketplace API 230, and the service provider system/server 212 may not be involved therein. The payment API 240 in an embodiment may be an API for a financial institution such as a bank where the data marketplace or the user have an account, or may be a third-party application not affiliated with any individual financial institution.

Figure 3:
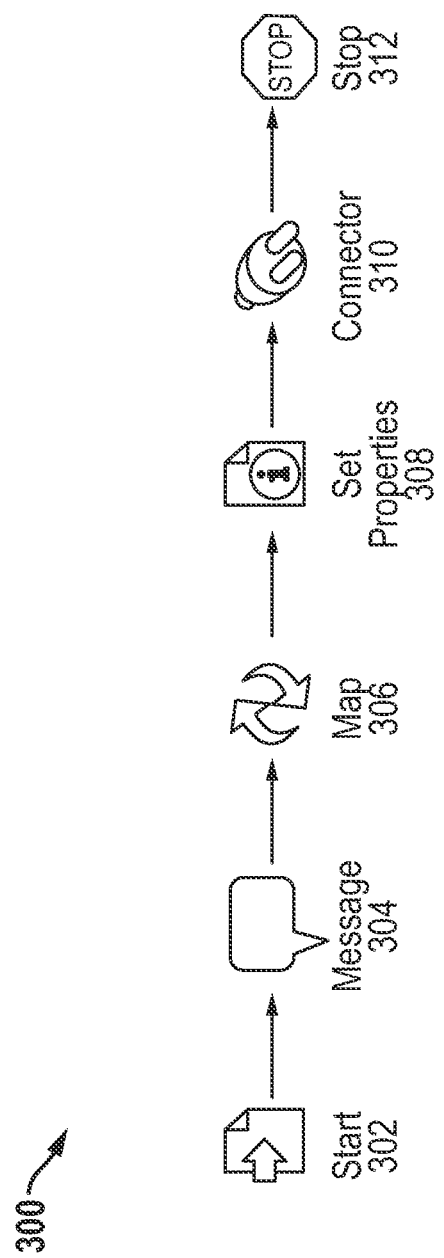
FIG. 3 is a graphical diagram illustrating a user-generated flow diagram of an integration process according to an embodiment of the present disclosure.

FIG. 3 is a graphical diagram illustrating a user-generated flow diagram of an integration process for exchange of electronic data records according to an embodiment of the present disclosure. As described herein, the service provider system/server in an embodiment may generate an integration application with code instructions for executing a business process data exchange between the user enterprise system/network and a trading partner (e.g., integration process). Such an integration process in an embodiment may be modeled by the user within an enterprise system/network using an integration process modelling graphical user interface (GUI) hosted by the service provider system/server. FIG. 3 describes such an integration process modelling GUI according to an example embodiment. A user may provide high-level user input indicating what the integration process should achieve via this GUI.

As also described herein, the service provider system/server may mine the data migrated pursuant to this user-modeled business process data exchange, based on the user input provided via the integration process modelling GUI to generate the integration application. The service provider system/server may receive a notification that the user wishes to either sell data migrated pursuant to the user-modelled integration process (e.g., a process modelled by the example embodiment described with reference to FIG. 3), or purchase data that is similar to such migrated data via a data marketplace API. The service provider system/server may then automatically generate code instructions for a sales integration process for transferring datasets from the enterprise system/network to the data marketplace API, or for a purchase integration process for transferring datasets from the data marketplace API to the enterprise system/network. Such a sales integration process or purchase integration process may perform subprocesses similar to those represented by visual elements described with reference to an example embodiment in FIG. 3. However, because the sales integration process or purchase integration process in an embodiment may be automatically generated by the service provider system/server, rather than a user, the sales integration process or purchase integration process may or may not be displayed via the integration process modelling GUI described with reference to FIG. 3. In other words, the primary function of the integration process modelling GUI is to receive user input for modelling an integration process, but the sales and purchase integration processes are not modelled by a user.

The flow diagram in an embodiment may be displayed within a portion of an integration process flow modeling user interface 300 that allows the user to build the process flow, deploy the integration process modeled thereby, and manage dataset field values manipulated by such an integration process. A user may generate a flow diagram in an embodiment by providing a chronology of process-representing integration elements via the use of an integration process-modeling user interface. In some embodiments, the integration process-modeling user interface may take the form of a graphical user interface. In such embodiments, the user-selectable elements representing integration sub-processes (e.g. connector integration elements) may be visual icons.

An integration process-modeling user interface in an embodiment may provide a design environment permitting a user to define process flows between applications/systems, such as between trading partner and enterprise systems, between on-site data centers and cloud-based storage modules, or between multiple applications, and to model a customized business integration process. Such an integration process-modeling user interface in an embodiment may provide a menu of pre-defined user-selectable elements representing integration sub-processes and permit the user to arrange them as appropriate to model a full integration process. For example, in an embodiment in which the integration process-modeling user interface is a graphical user interface, the elements may include visual, drag-and-drop icons representing specific units of work (known as process components) required as part of the integration process. Such process components in an embodiment may include invoking an application-specific connector to access, and/or manipulate data. In other embodiments, process components may include tasks relating to transforming data from one format to another, routing data down multiple paths of execution by examining the contents of the data, business logic validation of the data being processed, etc.

Each process component as represented by integration sub-process icons or elements may be identifiable by a process component type, and may further include an action to be taken. For example, a process component may be identified as a "connector" component. Each "connector" component, when chosen and added to the process flow in the integration process-modeling user interface, may allow a user to choose from different actions the "connector" component may be capable of taking on the data as it enters that process step. Further the integration process modeling user interface in an embodiment may allow the user to choose the dataset or data element upon which the action will be taken. The action and data element the user chooses may be associated with a connector code set, via the integration application management system, which may be pre-defined and stored at a system provider's memory in an embodiment.

In an embodiment, a user may choose a process component it uses often when interfacing with a specific trade partner or application, and define the parameters of that process component by providing parameter values specific to that trading partner or application. If the user wishes to use this process component, tailored for use with that specific trading partner or application repeatedly, the user may save that tailored process component as a trading partner or component named specifically for that application. For example, if the user often accesses NetSuite™ or SalesForce™, the user may create a database connector process component, associated with a pre-built connector code set that may be used with any database, then tailor the database connector process component to specifically access NetSuite™ or SalesForce™ by adding process component parameters associated with one of these applications. If the user uses this process component in several different integration processes, the user may wish to save this process component for later use by saving it as a NetSuite™ or SalesForce™ process component. In the future, if the user wishes to use this component, the user may simply select the NetSuite™ or SalesForce™ component, rather than repeating the process of tailoring a generic database connector process component with the specific parameters defined above.

As shown in FIG. 3, such process-representing visual elements may include a start element 302, a message element 304, a map element 306, a set properties element 308, a connector element 310, and a stop element 312. Other embodiments may also include a branch element, a decision element, a data process element, or a process call element, for example. A connector element 310, and a start element 302 in an embodiment may represent a sub-process of an integration process describing the accessing and/or manipulation of data. The start element 302 in an embodiment may also operate as a connector element.

In an embodiment, a start element 302 may operate to begin a process flow, and a stop element 312 may operate to end a process flow. As discussed above, each visual element may require user input in order for a particular enterprise or trading partner to use the resulting process. The start element 302 in an embodiment may further allow or require the user to provide data attributes unique to the user's specific integration process, such as, for example, the source of incoming data to be integrated. For example, the user may use a connector element to define a connection (e.g., an application managing data upon which action is to be taken), and the action to be taken. A user may use a start element 302 to further define a location of such data, according to the language and storage structure understood by the application managing such data. Dataset field values to be accessed at the start element 302 may be identified by a dataset field name given in a format that adheres to the code language and storage structure used by the application/location/enterprise at which such a dataset field value may be accessed. Insertion of the start element 302, or of a connector element 310 in an embodiment may prompt a user to provide user-defined mapping between dataset schema (e.g., defining dataset field names) for the source of such a dataset and the destination for such a destination, as described in greater detail with reference to FIGS. 4A and 4B.

A map element 306, or TransformMap element in an embodiment may associate a first dataset field name for a dataset field value being retrieved from a first application or source with a second dataset field name under which that dataset field value will be stored at a second application or destination. A set properties element 308 in an embodiment may allow the user to set values identifying specific files. A connector element 310 may operate in a similar manner to the start element 302 to define an action to be taken on an identified dataset. Connector elements 310 in an embodiment may differ from start elements 302 in that they do not necessarily occur at the beginning of an integration process. The stop element 312 in an embodiment may operate to terminate the integration process.

As described herein, the service provider system/server may automatically generate code instructions for a sales integration process, or for a purchase integration process, both of which may perform subprocesses similar to those represented by visual elements described with reference to an example embodiment in FIG. 3. For example, the sales integration process or the purchase integration process in an embodiment may perform tasks similar to those modeled by the start visual element 302, the map visual element 306, the connector visual element 310, or the stop visual element 312. In other embodiments, such processes may include subprocesses or tasks that may be represented by any number of other visual elements. However, because the sales integration process or purchase integration process in an embodiment may be automatically generated by the service provider system/server, rather than a user, the sales integration process or purchase integration process may or may not be displayed via the integration process modelling GUI described with reference to FIG. 3.

The integration application management system in an embodiment may associate each of the visual elements within the integration process-modeling graphical user interface with a set of code instructions written in a machine-readable, executable format. For example, the integration application management system in an embodiment may associate the start element 302 with a connector code set, written in a human-readable, machine-executable code language (e.g., JSON or XML), that includes code instructions for accessing a dataset field value associated with a user-specified dataset field name defined within the start element 302. Upon generation and storage within a memory of each of the code sets associated with each of the visual elements within the integration process-modeling graphical user interface 300 in an embodiment, the integration application management system may further generate a runtime engine capable of executing each of these code sets. The integration application management system in an embodiment may transmit the runtime engine and each of the code sets for execution of the integration process modeled by the user via the integration process modeling graphical user interface for execution of the integration process at a remote location (e.g., behind the firewall of a user's enterprise system/network).

By receiving the user input modelling an integration process between the user and a trading partner via the integration process modelling GUI, as described above, embodiments of this application may track the different ways in which data shared during these user-modelled integration processes are organized and stored at each of the various trading partners. Leveraging this tracking information, embodiments of the present disclosure may identify opportunities for the sale of such data, or purchasing of similar data, through one or more online data marketplaces. In other words, the ways in which embodiments of the present application track the migration of data pursuant to user-modeled integration processes occurring as part of these users' normal course of business may serve the dual purpose of data mining to determine if there is a market for the sale of such data.

Figure 4A:
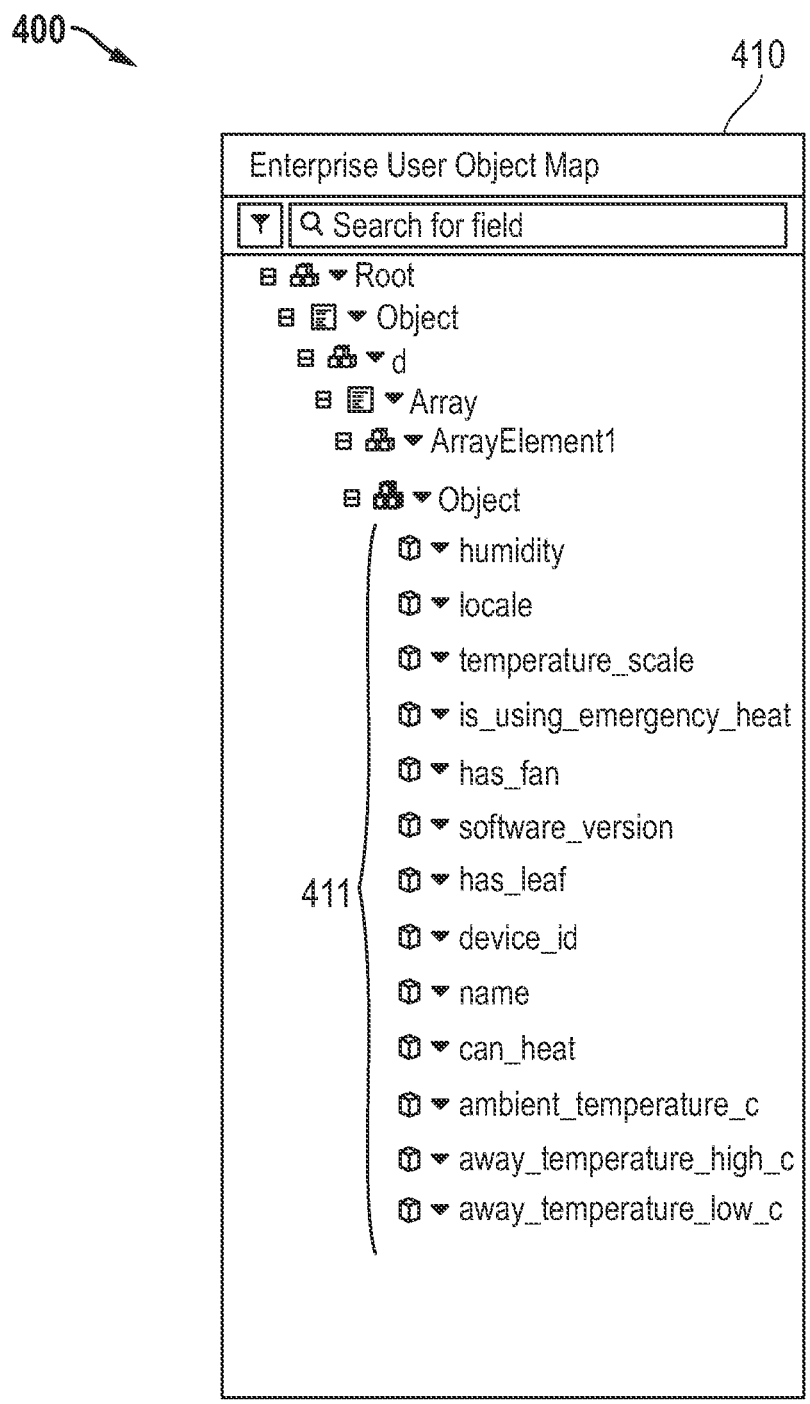
FIG. 4A is a graphical diagram illustrating an enterprise user object map according to an embodiment of the present disclosure.

FIG. 4A is a graphical diagram illustrating an enterprise user object map defining a plurality of dataset field names for dataset field values to be migrated pursuant to a user-modeled integration process according to an embodiment of the present disclosure. As described herein, insertion of the start element, or of a connector element into user-modeled integration process in an embodiment (e.g., in an embodiment described with reference to FIG. 3) may prompt a user to provide user-defined mapping between dataset schema (e.g., defining dataset field names) for the source of such a dataset and the destination for such a dataset. FIG. 4A depicts an object map graphical user interface 400 through which the user may provide or review such mapping. An enterprise user object map 410 may be displayed via the object map GUI 400, and may provide a structure for storage of a plurality of datasets 411 to be migrated pursuant to a user-modeled integration process. Each of the datasets 411 may be identified in the enterprise user object map 410 by their respective dataset field names (e.g., "humidity," "locale," "name," and "ambient_temperature_c").

A user may generate the enterprise user object map 410 by directly entering these dataset field names into the object map GUI in some embodiments. In such an embodiment, the integration application management system may add the information provided by the user via the object map GUI to information or user instructions associated with the visual elements added by the user via the integration process modeling user interface. For example, a dataset field name provided directly by the user via the object map GUI may be added to a connector visual element to identify a dataset to be migrated pursuant to the integration process modeled by the user via the integration process modeling GUI.

In other embodiments, the integration application management system may generate the enterprise user object map 410 based on information entered by the user into the integration process modeling graphical user interface during modeling of the integration process that migrates the datasets 411 identified in the enterprise user object map 410. In such an embodiment, the user may view the automatically generated enterprise user object map 410, and may make any changes necessary to correct errors via the object map GUI.

Figure 4B:
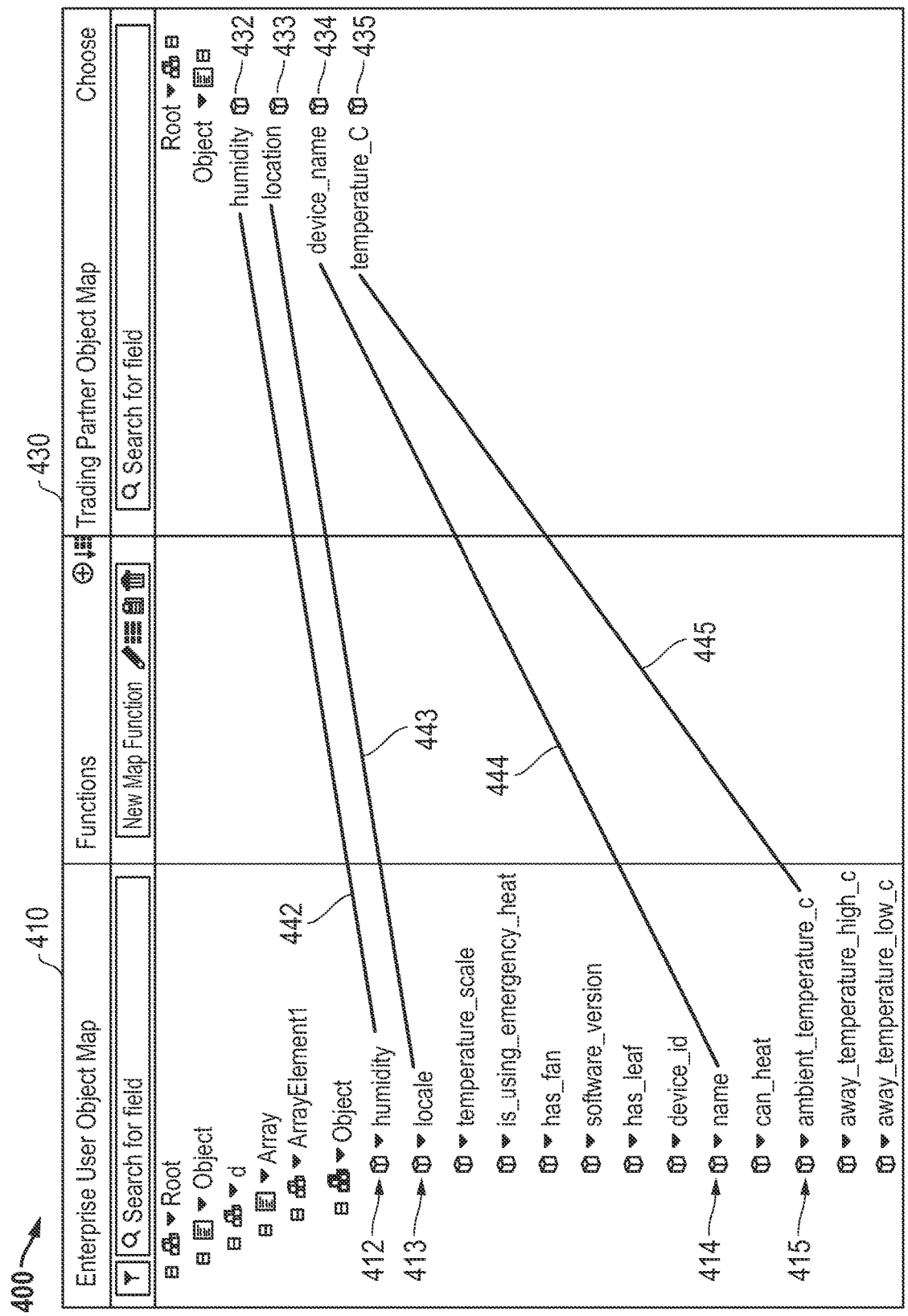
FIG. 4B is a graphical diagram illustrating a linked trading partner object map according to an embodiment of the present disclosure.

FIG. 4B is a graphical diagram illustrating a linked trading partner object map defining a plurality of dataset field names for dataset field values managed by the trading partner, remotely from the user that modeled the integration process, according to an embodiment of the present disclosure. As described herein, the object map graphical user interface 400 may be used to map relationships between different dataset field names for the same dataset field value. For example, a user may model an integration process to transmit a dataset field value having a field name "locale" at the user enterprise system/network to a trading partner, where the dataset field value may be stored under the dataset field name "location." In such a scenario, an object map graphical user interface 400 in embodiments described herein may display a link 443 between the dataset 413 having a field name "locale" within the enterprise user object map 410 and the dataset 433 having a field name "location" within the trading partner object map 430. Such a link 443 may indicate the dataset field value associated with the field name "locale" at the user enterprise system/ network may be stored, pursuant to the user-modeled integration process, with the dataset field name "location" at the trading partner.

Such a mapping may be repeated for each dataset identified within the enterprise user object map 410 in an embodiment. For example, a link 442 may be formed between a dataset 412 having a field name "humidity" at the user enterprise system/network, and a dataset 432 having a field name "humidity" at the trading partner. As another example, a link 444 may be formed between a dataset 414 having a field name "name" at the user enterprise system/ network, and a dataset 434 having a field name "device-_name" at the trading partner. In yet another example, a link 445 may be formed between a dataset 415 having a field name "ambient_temperature_c" at the user enterprise system/network, and a dataset 435 having a field name "temperature_C" at the trading partner. In such a way, the enterprise user object map may include dataset field names for each dataset to be migrated between an enterprise user and a trading partner, according to a user-modeled integration process in an embodiment.

Figure 5:
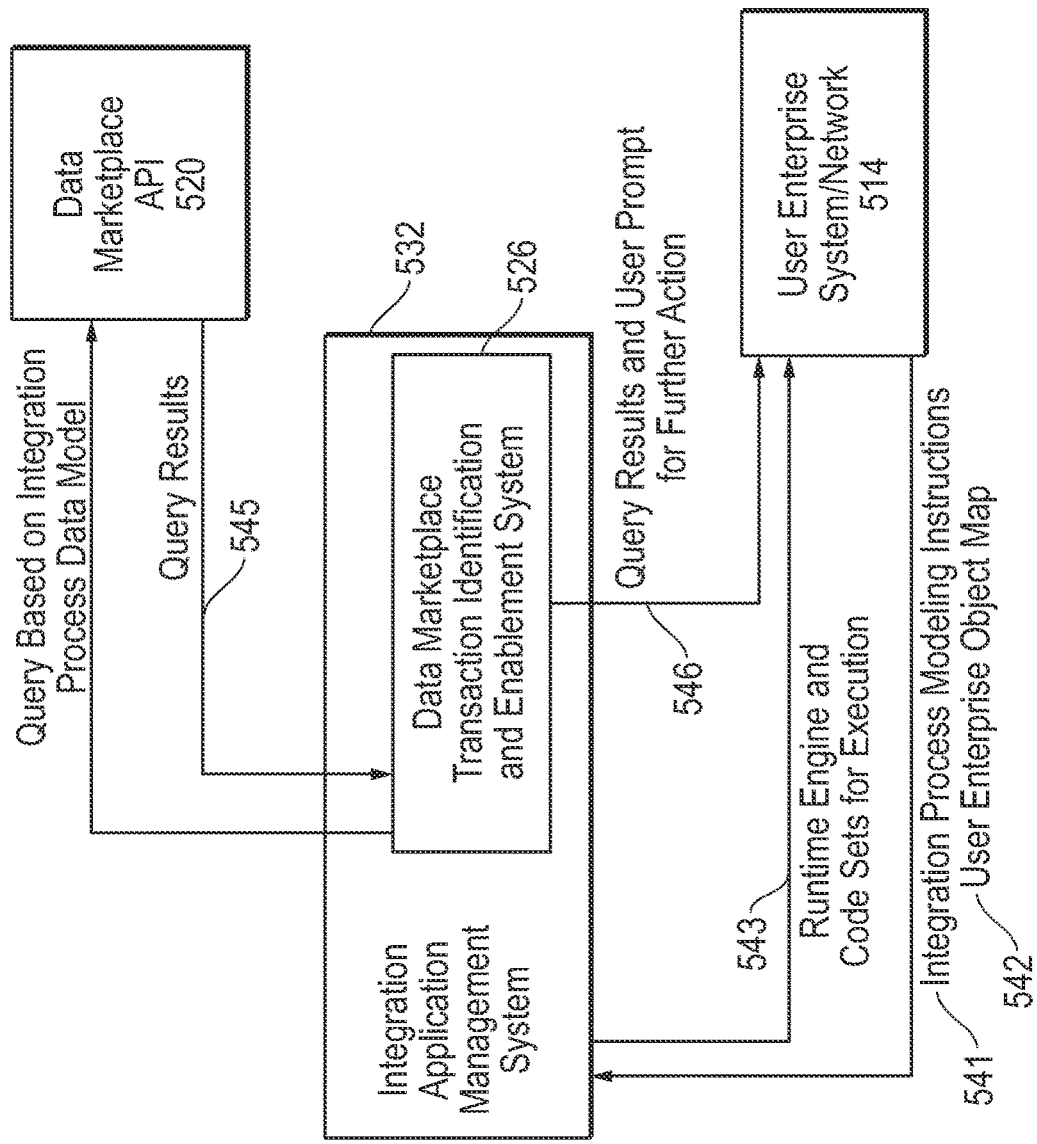
FIG. 5 is a graphical diagram illustrating a data marketplace transaction identification and enablement system querying a data marketplace API according to an embodiment of the present disclosure.

FIG. 5 is a graphical diagram illustrating a data marketplace transaction identification and enablement system querying a data marketplace API to determine opportunities for sales or purchase of integration data according to an embodiment of the present disclosure. As described herein, most businesses significantly underutilize the data they gather and share via integration processes, because of a lack of tools available to quickly and accurately identify, categorize, and access the large volumes of data being transmitted among various businesses. The data marketplace transaction identification and enablement system 526 in an embodiment may leverage the mapping and linking of various datasets across various locations, performed by the integration application management system 532, to identify opportunities for the sale of such data, or purchasing of similar data through one or more online data marketplaces. Both the integration application management system 532 and the data marketplace transaction identification and enablement system 526 may operate at a service provider system/server in an embodiment.

In an embodiment, a user within an enterprise system/ network 514 may build a process flow for an integration process using an integration process flow modeling graphical user interface managed by an integration application management system 532. The user may transmit integration process modeling instructions 541 to the integration application management system 532 by using the integration process flow modeling graphical user interface to model a process flow, as described in greater detail with reference to FIG. 3. The user may also transmit user enterprise object map 542 to the integration application management system 532 via the object model graphical user interface described in greater detail with reference to FIGS. 4A and 4B. The user enterprise object map 542 in an embodiment may describe the storage structure at the user enterprise system/network 514 for various datasets to be integrated via the integration modeled using the integration process flow modeling graphical user interface. In an embodiment, the user enterprise object map 542 may further provide dataset field names for the dataset field values to be integrated via the modeled integration process, a name for the integration process, and an optional user-provided description of the process. In some embodiments, the user enterprise object map 542 may also describe the storage structure, and dataset field names for locations other than the user enterprise system/network 514 where the datasets will be migrated to or from pursuant to the modeled integration process.

As described herein, each dataset may contain a userdefined or proprietary dataset field name, which may be associated with a dataset field value. In other words, datasets may be modeled using a fieldname:value pairing. For example, a dataset managed by the user enterprise system/ network 514 may include a dataset having a dataset field name "locale." In contrast, a trading partner receiving the dataset value associated with the dataset field name "locale" at the user enterprise system/network 514 may store such a dataset field value under the field name "location," as described with reference to FIG. 4B. Thus, a single dataset field value may be described in a single integration process using a plurality of dataset field names (e.g., "locale"/ "location," "name"/"device_name," "ambient_temperature_c"/"temperature_C,"), each adhering to the naming conventions set by databases, the APIs, applications, enterprises, or trading partners through or among which the dataset field value is programmed to integrate. The user enterprise object map 542 in an embodiment may map the various dataset field names that may be associated with a single dataset field value throughout the course of a modeled integration process, as described in greater detail with reference to FIG. 4B.

The data marketplace transaction identification and enablement system 526 may access this mapping and linking of various datasets across various locations, as managed by the integration application management system 532, to identify opportunities for the sale of such data, or purchasing of similar data through one or more online data marketplaces. Such a live marketplace for data sales may exist or be established in a network such as a Boomi® developer network to allow members to trade, buy, and sell data. The data marketplace transaction identification and enablement system may increase the chances of identifying potential opportunities for sale (and thus tap undiscovered revenue streams) by searching the data marketplace API 520 using each of the multiple descriptions for a given dataset field value provided by such linked mapping (e.g., as described with reference to FIGS. 4A and 4B). For example, the data marketplace transaction identification and enablement system 526 in an embodiment may transmit a query 544 to data marketplace API 520, to determine whether data migrated pursuant to the user enterprise system/network 514 user-modeled integration process may be offered for sale, or whether the marketplace offers data similar to the user's data for purchase.

The data marketplace transaction identification and enablement system 526 may retrieve each of the dataset field names identified in the user enterprise object map 542, as well as the integration process name and integration process description in an embodiment. The data marketplace transaction identification and enablement system 526 in an embodiment may then perform different queries 544 at the data marketplace API 520 for each of the dataset field names and the integration process name, or may perform one or more combined queries 544 of these terms. In some embodiments, for example, a neural network may be employed to determine an industry in which the user enterprise system/ network 514 is transacting business, based on the dataset field names, integration process name, or user-provided integration process description within the user enterprise object map 542 and generate a dataset marketplace domain classification. In such an embodiment, the query 544 may involve querying the data marketplace API 520 as to whether it manages data within the determined industry under such dataset marketplace domain classification.

The data marketplace API 520 in an embodiment may return query results 545 indicating whether the data marketplace manages datasets similar to the datasets migrated pursuant to the integration process modeled by the user enterprise system/network 514 via the integration application management system 532 such as those with a common data marketplace domain classification. If the query results 545 in an embodiment indicate the data marketplace API 520 does not manage any similar datasets, the data marketplace transaction identification and enablement system 526 may transmit a notification 546 to the user enterprise system/ network 514 that an opportunity for sale of one or more datasets migrated pursuant to the user-modeled integration process may be available. For example, no data marketplace domain classification datasets currently are found at the marketplace. Such a notification 546 may further include a prompt for the user to initiate an automated sales process of those datasets, or to indicate she does not wish to engage in such a sale. User verification of permission to sell may also be recorded before sale of identified datasets, such as those of a particular data marketplace domain classification as permitted via the marketplace API.

If the query results 545 in an embodiment indicate the data marketplace API 520 manages datasets similar to those migrated pursuant to the user-modeled integration process, the data marketplace transaction identification and enablement system 526 may transmit a notification 546 to the user enterprise system/network 514 that an opportunity for the user to purchase data similar to the datasets migrated pursuant to the user-modeled integration process may be available. A search engine for a data marketplace query may utilize keywords or particular industry identifying words from a name, description fields of data categories, or description fields of any other components of a developed business integration process or processes. Similarly, metadata may be searched within a business integration process profile, such as a Boomi profile, for definitions of Boomi integration process utilization. With the above data, such as the found word terms, one or more artificial intelligence services, such as third party services like Amazon Web Services® Comprehend or others, may be used to identify an industry or domain that applies. The analysis of the names and metadata may include a domain that may be fed into a query at a data marketplace. For example, the data marketplace API may indicate available datasets with matching, or sufficiently overlapping data marketplace domain classification values. As described herein, when leveraged optimally, such data may be used by various businesses or industries to streamline production, minimize costs, and support other optimization and prediction activities (e.g., predicting consumer trends). Purchasing datasets available via data marketplaces in an embodiment may, for example, allow the user enterprise system/network 514 to more accurately model maintenance timelines for machinery, by basing those models on richer, fuller datasets than those gathered directly by the user enterprise system/network 514. The notification 546 in such an embodiment may further prompt the user to initiate an automated purchase process for similar datasets available for purchase from the data marketplace API 520, or for the user to indicate she does not wish to engage in such a purchase. A query may be made to one or more known data marketplaces in some embodiments.

Figure 6A:
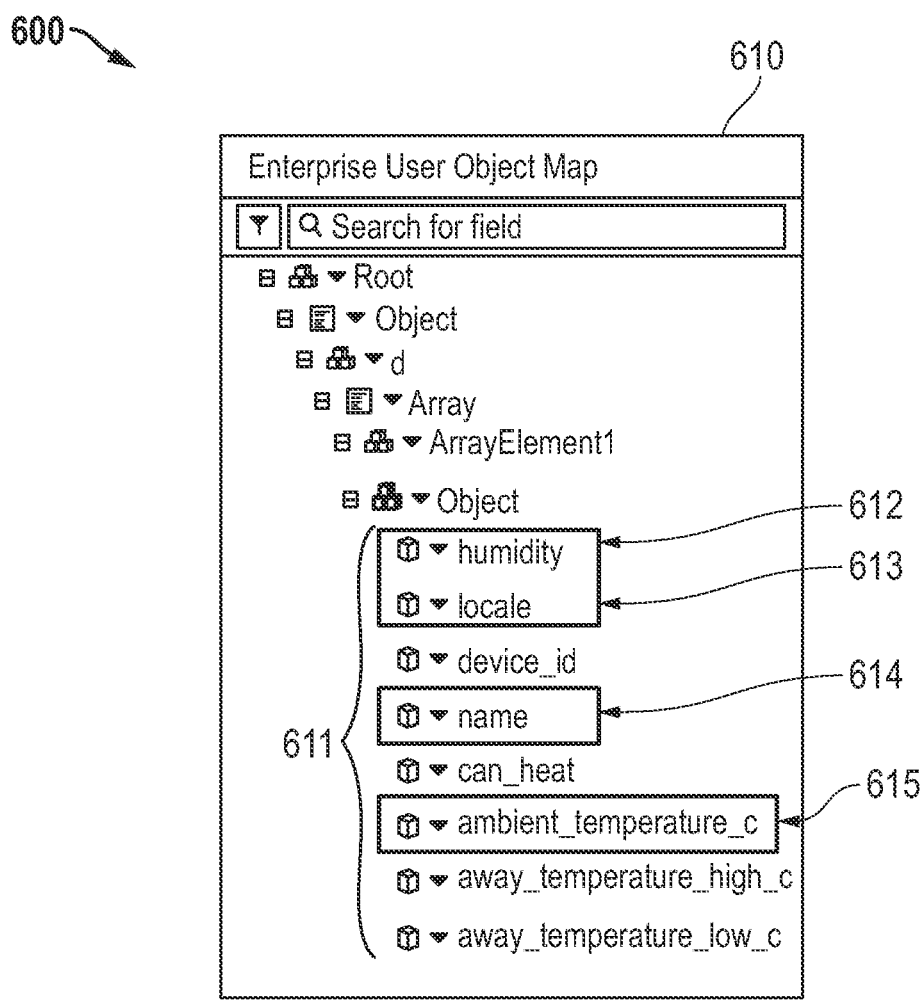
FIG. 6A is a graphical diagram illustrating a user enterprise object map according to an embodiment of the present disclosure.

FIG. 6A is a graphical diagram illustrating a user enterprise object map automatically generated by the data marketplace transaction identification and enablement system to define a plurality of dataset field names for dataset field values to be transacted between a user enterprise and a data marketplace according to an embodiment of the present disclosure. As described herein, the data marketplace transaction identification and enablement system may transmit a notification to the user enterprise system/network that an opportunity for sale of one or more datasets migrated pursuant to the user-modeled integration process may be available, and prompt the user to initiate an automated sales process of those datasets. Such a prompt may be provided via the object map graphical user interface 600 in an embodiment.

The data marketplace transaction identification and enablement system in an embodiment may identify each of the datasets migrated pursuant to the user-modeled integration process that did not match any known datasets managed by the data marketplace API using the query described with respect to FIG. 5. In such an embodiment, the data marketplace transaction identification and enablement system may access and edit the enterprise user object map generated by the user or the integration application management system, described with reference to FIG. 4A in order to generate the enterprise user object map 610. For example, the data marketplace transaction identification and enablement system may retrieve the enterprise user object map 410 (e.g., including thirteen dataset field names), and remove all dataset field names similar to datasets the data marketplace transaction identification and enablement system has determined the data marketplace API manages. More specifically, the data marketplace transaction identification and enablement system may determine, by querying the data marketplace API, that the data marketplace API manages datasets similar to those stored at the enterprise user under the field names "temperature_scale," "is_using_emergency_heat," "has_fan," "software_version," and "has_leaf."

In another example embodiment, the data marketplace transaction identification and enablement system may determine the dataset field names "temperature_scale," "is_using_emergency_heat," "has_fan," "software_version," and "has_leaf" fall within a first data marketplace domain classification (e.g., HVAC). In such an example embodiment, the data marketplace transaction identification and enablement system may determine the dataset field names "humidity," "locale," "name," and "ambient temperature" do not fall within the first data marketplace domain classification (e.g., HVAC), or that these dataset field names fall within a second data marketplace domain classification (e.g., smart home). The data marketplace transaction identification and enablement system may determine through querying the data marketplace API that a marketplace exists for datasets in the smart home data marketplace domain classification, but does not exist for datasets in the HVAC data marketplace domain classification, for example.

Each of the dataset field names migrated pursuant to an integration process may be included within the enterprise user object map 410 in an embodiment, regardless of whether a market exists for the sale or purchase of such data. The data marketplace transaction identification and enablement system in an embodiment may generate the list of dataset field names 611 by removing each of the dataset field names from the enterprise user object map 410 for which the data marketplace transaction identification and enablement system has not identified a market. For example, in an embodiment in which the data marketplace transaction and identification and enablement system has not identified a market for the sale or purchase of the dataset specifically identified as "is_using_emergency_heat," the list of dataset field names 611 may not include this dataset field name. As another example, in an embodiment in which the data marketplace transaction and identification and enablement system has not identified a market for the sale or purchase of datasets falling within the HVAC data marketplace domain classification, as described above, the list of dataset field names 611 may not include the dataset field names "temperature_scale," "is_using_emergency_heat," "has_fan," "software_version," and "has_leaf." Thus, the enterprise user object map 610 may include only eight dataset field names at 611, in contrast to the thirteen included within the enterprise user object map 410 at 411.

Upon generation of the enterprise user object map 610 in an embodiment, the data marketplace transaction identification and enablement system may prompt the user to select one or more of the dataset field names within the user enterprise object map that the user wishes to offer for sale via the data marketplace API. These may fall under a data marketplace domain classification not matched in the marketplace API in one example embodiment. For example, the user may click on, highlight, tick a box, or perform some other known method of selecting text via a graphical user interface in an embodiment to select the dataset field names "humidity" 612, "local" 613, "name" 614, and "ambient_temperature_c" 615. Such a selection in an embodiment may represent a user instruction to offer the datasets having these field names, as managed by the user enterprise network/system for purchase via an identified data marketplace. In some cases, the user may select all datasets falling within the data marketplace domain classification for which the data marketplace transaction identification and enablement system has identified a market.

In other embodiments, the data marketplace transaction identification and enablement system may determine the data marketplace API already offers for sale similar datasets to those managed by the user enterprise system/network. For example, the data marketplace transaction identification and enablement system in an embodiment described with reference to FIG. 4 may determine one or more of the dataset field names provided within the enterprise user object map 410 match datasets managed by the data marketplace API by repeatedly querying the data marketplace API. In another example, the data marketplace transaction identification and enablement system may determine one or more of the dataset field names provided within the enterprise user object map 410 fall within a data marketplace domain classification for which the data marketplace API provides a market. In such an embodiment, the data marketplace transaction identification and enablement system may list each of those matching dataset field names and prompt the user to select one or more that she may wish to purchase via the data marketplace API. For example, the data marketplace transaction identification and enablement system in an embodiment may list each of the matching datasets managed by the data marketplace API within a data marketplace object map (not shown, but discussed in greater detail with respect to FIG. 6B), and prompt the user to select one or more of these datasets for purchase. In another embodiment, the data marketplace transaction identification and enablement system may map one or more links between each of the matching datasets managed by the data marketplace API and the corresponding datasets managed by the user enterprise system/network within the enterprise user object map 610 that have sufficiently similar data marketplace domain classifications. The data marketplace transaction identification and enablement system may then prompt the user to select one or more of these datasets for purchase by selecting the corresponding dataset within the enterprise user object map 610. For example, the user may select to purchase datasets managed by the data marketplace API corresponding to or matching datasets 612, 613, 614, and 615.

Figure 6B:
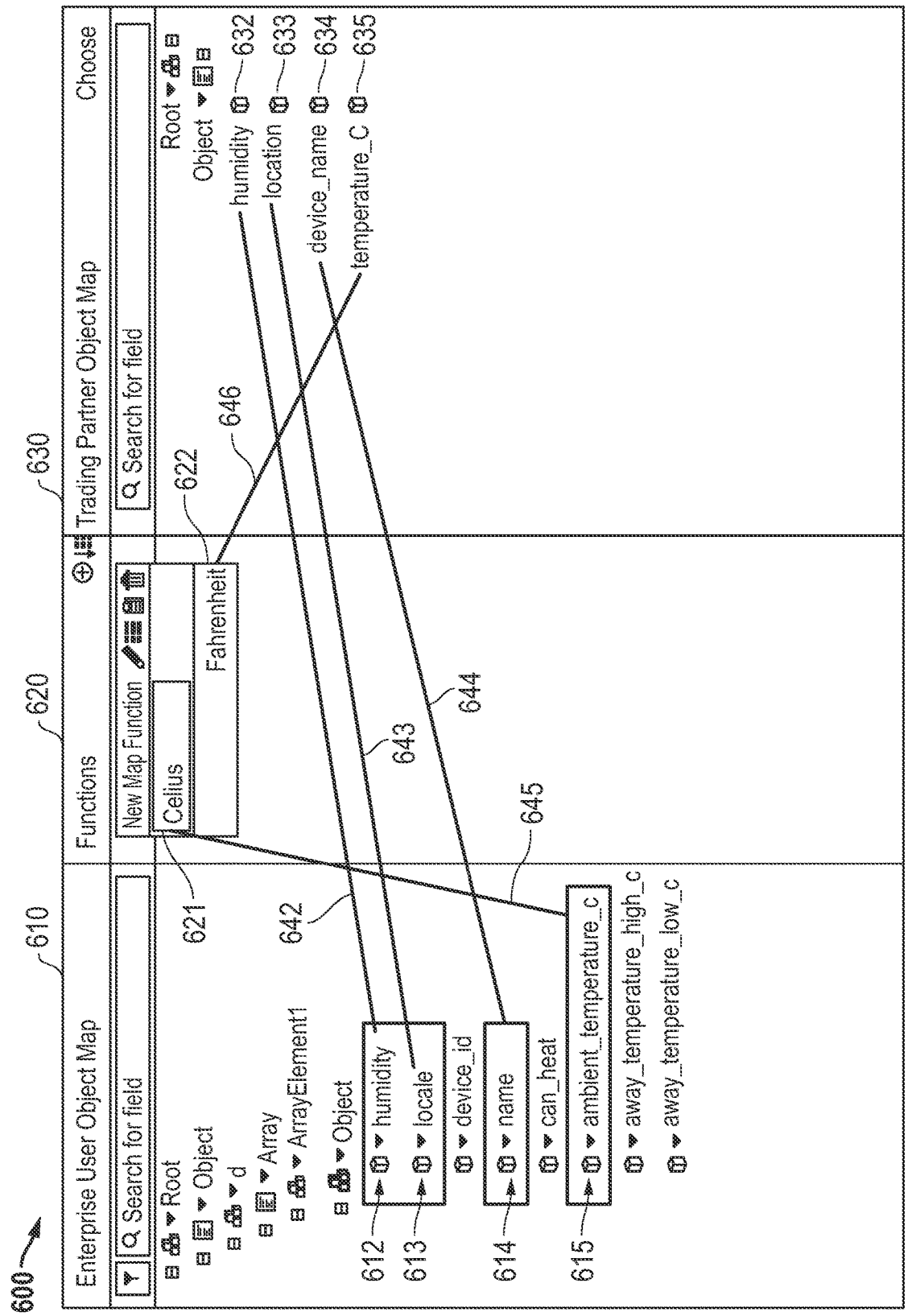
FIG. 6B is a graphical diagram illustrating a linked data marketplace object map according to an embodiment of the present disclosure.

FIG. 6B is a graphical diagram illustrating a linked data marketplace object map automatically generated by the data marketplace transaction identification and enablement system to define a plurality of dataset field names for dataset field values to be transacted between a user enterprise and a data marketplace according to an embodiment of the present disclosure. As described herein, the object map graphical user interface 600 in an embodiment may be used to map relationships between different dataset field names for the same dataset field value. FIG. 4B above describes a user-defined or user-modeled linking between datasets in the enterprise user object map and a trading partner object map, associated with a user-modeled integration process migrating such linked datasets between the enterprise user and the trading partner. FIG. 6B, in contrast describes a linking between datasets stored and managed at the enterprise user and datasets stored and managed at the data marketplace API that may reflect data marketplace domain classifications for datasets. Further, the linking between such datasets in FIG. 6B may be performed by the data marketplace transaction identification and enablement system in an embodiment, rather than a user that has modeled an integration process via the integration process modeling GUI. For example, the data marketplace transaction identification and enablement system may determine through a query of the data marketplace API that a dataset field name for a dataset managed by the data marketplace API and given within the data marketplace object map 630 matches one of the dataset field names in the user enterprise object map 610, and link those matching dataset field names together. In another example, the data marketplace transaction identification and enablement system may determine through a query of the data marketplace API that a market exists for the sale/purchase of datasets within a given data marketplace domain classifier, and link dataset field names within the user enterprise object map 610 falling within that data marketplace domain classifier to dataset field names within the data marketplace object map 630 falling within that data marketplace domain classifier.

The generation of the enterprise user object map and data marketplace object map, and the linking of various datasets therein may be performed automatically by the data marketplace transaction identification and enablement system in an embodiment upon user selection of one or more datasets she wishes to offer for sale, as described with reference to FIG. 6A. For example, the data marketplace transaction identification and enablement system in an embodiment may generate the data marketplace object map 630 in an embodiment by querying the data marketplace API, or by referencing documentation defining the storage schema for datasets associated with the data marketplace API. For example, users may search data marketplaces by typing free-form search words in an online search box user interface, or essentially performing the same searches via the data marketplace APIs in some embodiments. In other embodiments, searches may be tracked and this search usage behaviors may be captured as metadata by the data marketplace. In this way, current dominant searches may be discerned as high value opportunities while data marketplace searches that are decreasing in popularity may be deemed lower value. This may provide for additional criteria for data marketplace matching opportunities. For example, in a recent period of time by looking at the metadata capture from user searches of a data marketplace over a past 30 day period such as during the recent health pandemic, searches for SURGICAL MASK MANUFACTURING MACHINES device data may have increased over 50%, while searches for TRAFFIC FLOW data has decreased by 80% or searches for travel may have decrease by some percentage. Thus, determining the current dominant user searches present high value opportunities while the decreasing search terms may have decreased value. The data marketplace that is being queried may provide APIs that allow a user to request say the top searches over the past period of time in an example embodiment. This may be an enhanced aspect that may serve as a guide to understand data used by an enterprise is similar data, but also whether such matching data presents a monetization opportunity to add to one or more data marketplaces.

As described with reference to FIG. 6A, the user may select datasets managed by the user enterprise network/system for sale via the data marketplace API, including datasets having dataset field names "humidity" 612, "locale" 613, "name" 614, and "ambient_temperature_c" 615. In some embodiments, the user may select each of these dataset field names (e.g., 612, 613, 614, 615) individually. In other embodiments, the user may select all dataset field names falling within the same data marketplace domain classification. For example, the dataset field names "humidity" 612, "locale" 613, "name" 614, and "ambient_temperature_c" 615 may each fall within the data marketplace domain classification "smart home," and the user may be prompted to select all datasets falling within this data marketplace domain classification.

The data marketplace transaction identification and enablement system in such an embodiment may map links between each of these datasets offered for sale by the user and the dataset field name that should be associated with those datasets according to the dataset marketplace API schema documentation. For example, the dataset marketplace API documentation may require location data to be stored under the dataset field name "location," rather than "locale," as used by the user enterprise system/network. Thus, the dataset marketplace transaction identification and enablement system in such an embodiment may map link 643 between the enterprise user dataset field name "locale" 613 and the data marketplace dataset field name "location" 633. In another example, the dataset marketplace transaction identification and enablement system in such an embodiment may map link 642 between the enterprise user dataset field name "humidity" 612 and the data marketplace dataset field name "humidity" 632. In yet another example, the dataset marketplace transaction identification and enablement system in such an embodiment may map link 644 between the enterprise user dataset field name "name" 614 and the data marketplace dataset field name "device_name" 634. In such a way, the data marketplace transaction identification and enablement system may identify the dataset field name under which a user-identified dataset offered for sale may be stored via the data marketplace API.

In some cases, the dataset field values must be converted or adjusted prior to offering such datasets for sale via the data marketplace API. For example, a user enterprise system/network may record and store dataset field values for temperatures measured in centigrade, while the data marketplace API only purchases dataset field values for temperatures measured in Fahrenheit. In such scenarios, the dataset marketplace transaction identification and enablement system may automatically perform a function within the object map graphical user interface to convert the dataset field value for temperatures measured in centigrade to temperatures measured in Fahrenheit. For example, the data marketplace transaction identification and enablement system in an embodiment may add a link 645 between the user identified dataset field value associated with the dataset field name "ambient_temperature_c" 615 and the function 620. In such an embodiment, the function 620 may receive an input Celsius temperature at 621, and may convert such an input Celsius temperature 621 to an output Fahrenheit temperature 622. The data marketplace transaction identification and enablement system may then link 646 the output Fahrenheit temperature 622 to the dataset field name "temperature_F" 635. In such a way, the data marketplace transaction identification and enablement system may both convert the dataset field value for a user-identified dataset offered for sale to comply with the data marketplace API requirements and identify the dataset field name under which such a dataset may be stored via the data marketplace API.

In other embodiments, such as an embodiment described with reference to FIG. 6A, the data marketplace transaction identification and enablement system may determine the data marketplace API already offers for sale similar datasets to those managed by the user enterprise system/network. For example, the data marketplace transaction identification and enablement system may determine the data marketplace API already offers for sale datasets having field names similar or identical to dataset field names within the user enterprise object map 610. As another example, the data marketplace transaction identification and enablement system may determine one or more dataset field names within the user enterprise object map 610 fall within a given data marketplace domain classification, and that the data marketplace API already offers for sale datasets falling within the same or similar data marketplace domain classification.

In such embodiments, the data marketplace object map 630 may list each of the matching datasets managed by the data marketplace API and the data marketplace transaction identification and enablement system may prompt the user to select one or more of these datasets for purchase. In still another embodiment, the data marketplace transaction identification and enablement system may map links 642, 643, 644, 645, and 646 between each of the matching datasets 632, 633, 634, and 635 managed by the data marketplace API and the corresponding datasets 612, 613, 614, and 615 managed by the user enterprise system/network within the enterprise user object map 610, respectively. The data marketplace transaction identification and enablement system in such an embodiment may then prompt the user to select one or more of these datasets for purchase by selecting the corresponding datasets (e.g., 612, 613, 614, or 615) within the enterprise user object map 610.

Figure 7A:
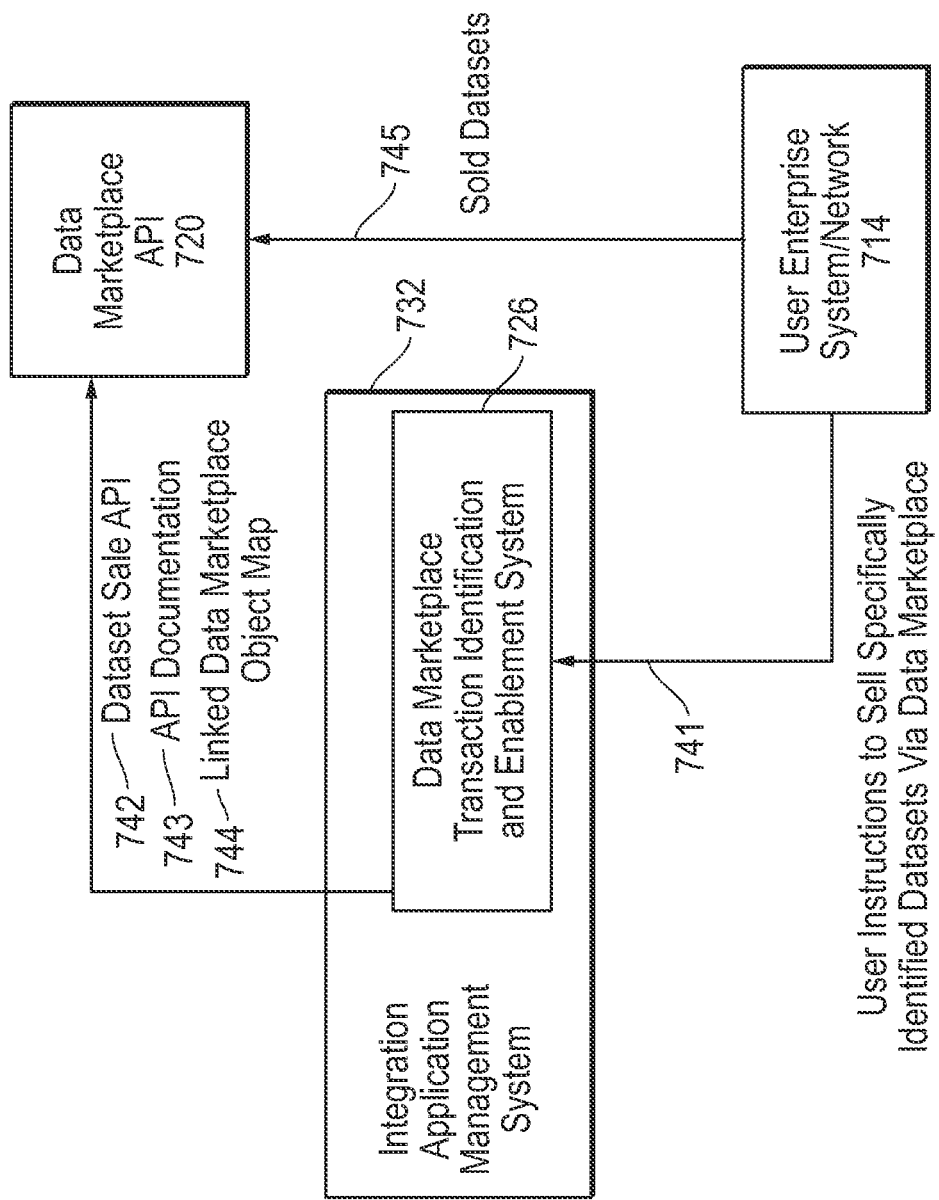
FIG. 7A is a graphical diagram illustrating a data marketplace transaction identification and enablement system automatically enabling sales of integration data according to an embodiment of the present disclosure.

FIG. 7A is a graphical diagram illustrating a data marketplace transaction identification and enablement system automatically enabling sales of integration data from a user modeling the integration process to a data marketplace according to an embodiment of the present disclosure. As described herein, most businesses significantly underutilize the data they gather, much less data available from other businesses. Such underutilization is due in large part to a lack of tools available to quickly and accurately identify, categorize, and access the large volumes of data being transmitted among various businesses. The data marketplace transaction identification and enablement system 726 in an embodiment may address these issues, potentially opening a new revenue stream for businesses. For example, the data marketplace transaction identification and enablement system 726 in an embodiment may automatically generate and execute integration processes to facilitate such sales, should the user wish to proceed in that direction.

The data marketplace transaction identification and enablement system 726 in an embodiment in which the user wishes to sell data may receive a user instruction 741 to sell specifically identified datasets via the data marketplace, as described in greater detail with respect to FIGS. 6A and 6B. For example, the data marketplace transaction identification and enablement system 726 may identify datasets migrated during regular integration process execution for which a marketplace exists. Such a determination may be made for example, by querying the data marketplace API for specific dataset field names of datasets so migrated, or by determining the data marketplace domain classification for datasets so migrated, and querying the data marketplace API for such a data marketplace domain classification. Then, with approval of a user, the data marketplace transaction identification and enablement system 726 may establish a dataset sales integration process via the integration application management system 732 to make transfer of user-selected datasets pursuant to an agreed sale.

As part of this process, the data marketplace transaction identification and enablement system 726 may determine the location, structure, and schema for storage of the datasets to be offered for sale via the data marketplace API 720. The data marketplace transaction identification and enablement system 726 in such an embodiment may also determine the location at which the user enterprise system/network 714 would store the datasets offered for sale by the user, and structure or schema for such storage.

The data marketplace transaction identification and enablement system 726 or the integration application management system 732 in an embodiment may then generate an integration process for transmitting datasets managed by the user enterprise system/network 714 to the data marketplace API 720, pursuant to the user instruction 741. For example, the data marketplace transaction identification and enablement system 726 in an embodiment may model an integration process having a start visual element that identifies the dataset managed by the user enterprise system/network 714 and selected by the user for sale, using the user-defined storage schema or dataset field naming convention. The same integration process in such an embodiment may also include a connector visual element, for example, that identifies the dataset field name and location under which the dataset field value associated with the user-managed dataset offered for sale by the user may be stored via the data marketplace API 720 following purchase by the data marketplace API 720. Each of these visual elements may then be associated with code instructions generated by the integration application management system and a dataset purchase API generated for remote execution of the dataset sales integration process.

In another embodiment, the data marketplace transaction identification and enablement system 726 may transmit to the integration application management system 732 the location and dataset field name for the datasets stored at the user enterprise system/network 714 and offered for sale. The data marketplace transaction identification and enablement system 726 in such an embodiment may also transmit the location and dataset field name under which dataset field values associated with the user-managed datasets offered for sale by the user may be stored or received by the data marketplace API 720. In such an embodiment, the integration application management system 732 may then model an integration process having a start visual element that identifies the dataset managed by the user enterprise system/network 714 and selected by the user for sale, using the user-defined storage schema or dataset field naming convention. The same integration process in such an embodiment may also include a connector visual element, for example, that identifies the dataset field name and location under which the dataset field value associated with the user-managed dataset offered for sale by the user may be stored via the data marketplace API 720. Each of these visual elements may then be associated with code instructions generated by the integration application management system and a dataset sales API generated for remote execution of the dataset sales integration process generated.

In yet another embodiment, the integration application management system 732, or the data marketplace transaction identification and enablement system 726 may generate the code instructions for performing such an integration process, without generating an integration process flow model using visual elements. In such embodiments, and in embodiments in which an integration process flow model is generated by either the data marketplace transaction identification and enablement system 726 or the integration application management system 732, the data marketplace transaction identification and enablement system 726 may transmit the dataset sales API 742 that results from the dataset sales integration process formed to create the dataset sales API and supporting documentation 743 to the data marketplace API 720. The dataset sales integration process may not be provided or displayed in a GUI, but may be generated nonetheless to facilitate sales of datasets selected for sale by the user. In some embodiments, the data marketplace transaction identification and enablement system 726 may further transmit to the data marketplace API 720 the linked data marketplace object map 744 to the data marketplace API 720.

The API 720 may automatically engage the dataset sale API 742 to execute the underlying integration process. In such an embodiment, the dataset sale API 742 may execute the underlying dataset sales integration process, causing the user-sold datasets 745 to be transmitted automatically, without any user intervention, from the user enterprise system/network 714 to the data marketplace API 720. In such a way, the data marketplace transaction identification and enablement system may automatically identify opportunities for sales of user-managed datasets and enable such sales.

Figure 7B:
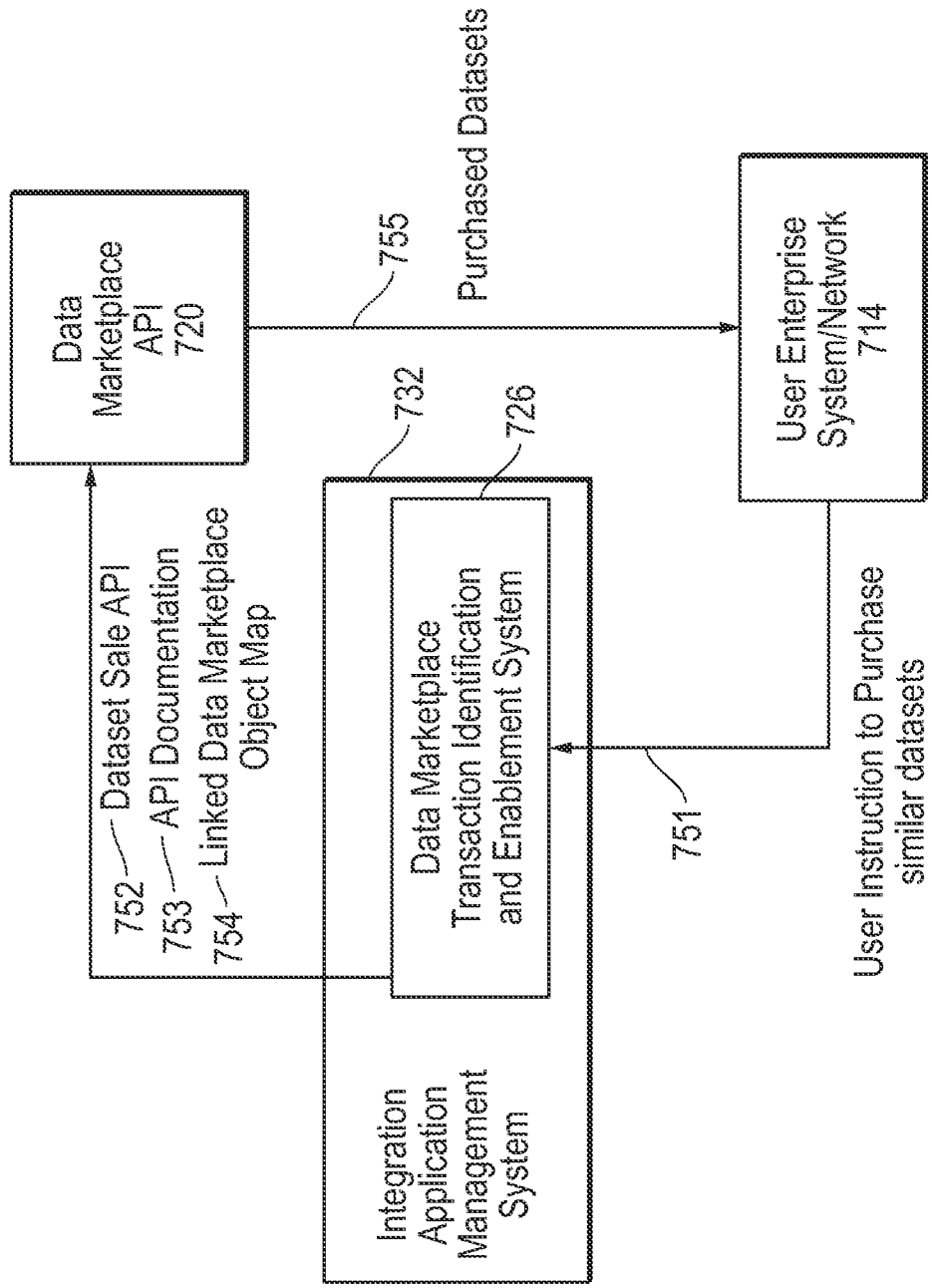
FIG. 7B is a graphical diagram illustrating a data marketplace transaction identification and enablement system automatically enabling purchase of data similar to integration data according to an embodiment of the present disclosure.

FIG. 7B is a graphical diagram illustrating a data marketplace transaction identification and enablement system automatically enabling purchase of data similar to integration data from a data marketplace by a user modeling the integration process according to an embodiment of the present disclosure. As described herein, the data marketplace transaction identification and enablement system 726 in an embodiment may address underutilization of publicly available data by alerting a user to potentially useful data available for purchase, and automatically enabling that purchase pursuant to user instruction. For example, the data marketplace transaction identification and enablement system 726 in an embodiment may automatically generate and execute integration processes to facilitate such purchases, should the user wish to proceed in that direction.

The data marketplace transaction identification and enablement system 726 in an embodiment in which the user wishes to purchase data may receive a user instruction 751 to purchase specifically identified datasets via the data marketplace, as described in greater detail with respect to FIGS. 6A and 6B. For example, the data marketplace transaction identification and enablement system 726 may identify datasets migrated during regular integration process execution for which similar datasets are available for purchase via the data marketplace API. Such a determination may be made for example, by querying the data marketplace API for specific dataset field names of datasets so migrated, or by determining the data marketplace domain classification for datasets so migrated, and querying the data marketplace API for such a data marketplace domain classification. Then, with approval of a user, the data marketplace transaction identification and enablement system 726 may establish a dataset purchase integration process via the integration application management system 732 to make transfer of user-selected datasets from the data marketplace API 720 to the user enterprise system/network 714, pursuant to an agreed purchase by the user.

As part of this process, the data marketplace transaction identification and enablement system 726 may determine the location, structure, and schema for storage of the datasets to be purchased by the user via the data marketplace API 720. The data marketplace transaction identification and enablement system 726 in such an embodiment may also determine the location at which the user enterprise system/network 714 may store such purchased datasets, and structure or schema for such storage.

The data marketplace transaction identification and enablement system 726 or the integration application management system 732 in an embodiment may then generate a dataset purchase integration process for transmitting datasets managed by the data marketplace API 720 to the user enterprise system/network 714, pursuant to the user instruction 751 to purchase such datasets. For example, the data marketplace transaction identification and enablement system 726 in an embodiment may model a dataset purchase integration process having a start visual element that identifies the dataset field name and location under which the dataset field value offered for purchase by the data marketplace API 720 may be stored by the data marketplace API 720. The same dataset purchase integration process in such an embodiment may also include a connector visual element that identifies the location and dataset field name within the user enterprise system/network 714 under which such a user-purchased dataset may be stored. Each of these visual elements may then be associated with code instructions generated by the integration application management system and a dataset purchase API generated for remote execution of the dataset purchase integration process.

In another embodiment, the data marketplace transaction identification and enablement system 726 may transmit to the integration application management system 732 the location and dataset field name under which the purchased datasets may be stored at the user enterprise system/network 714, as well as the location and dataset field name under which the purchased datasets are stored by the data marketplace API 720. In such an embodiment, the integration application management system 732 may then model a dataset purchase integration process having a start visual element that identifies the dataset field name and location under which the dataset field value offered for purchase may be stored by the data marketplace API 720. The same dataset purchase integration process in such an embodiment may also include a connector visual element that identifies the location and dataset field name within the user enterprise system/network 714 under which such a purchased dataset may be stored. Each of these visual elements may then be associated with code instructions generated by the integration application management system and a dataset purchase API generated for remote execution of the dataset purchase integration process.

In yet another embodiment, the integration application management system 732, or the data marketplace transaction identification and enablement system 726 may generate the code instructions for performing such a dataset purchase integration process, without generating an integration process flow model using visual elements in a GUI. In such embodiments, and in embodiments in which an integration process flow model is generated by either the data marketplace transaction identification and enablement system 726 or the integration application management system 732, the data marketplace transaction identification and enablement system 726 may transmit the dataset purchase API 752 and supporting documentation 753 to the data marketplace API 720. In some embodiments, the data marketplace transaction identification and enablement system 726 may further transmit to the data marketplace API 720 the linked data marketplace object map 754 to the data marketplace API 720.

The API 720 may automatically engage the dataset purchase API 742 to execute the underlying integration process. In such an embodiment, the dataset purchase API 742 may execute the underlying integration process, causing the purchased datasets 755 to be transmitted automatically, without any user intervention, from the data marketplace API 720 to the user enterprise system/network 714. In such a way, the data marketplace transaction identification and enablement system may automatically identify opportunities for purchase of datasets similar to user-managed datasets and enable such purchases.

Figure 8:
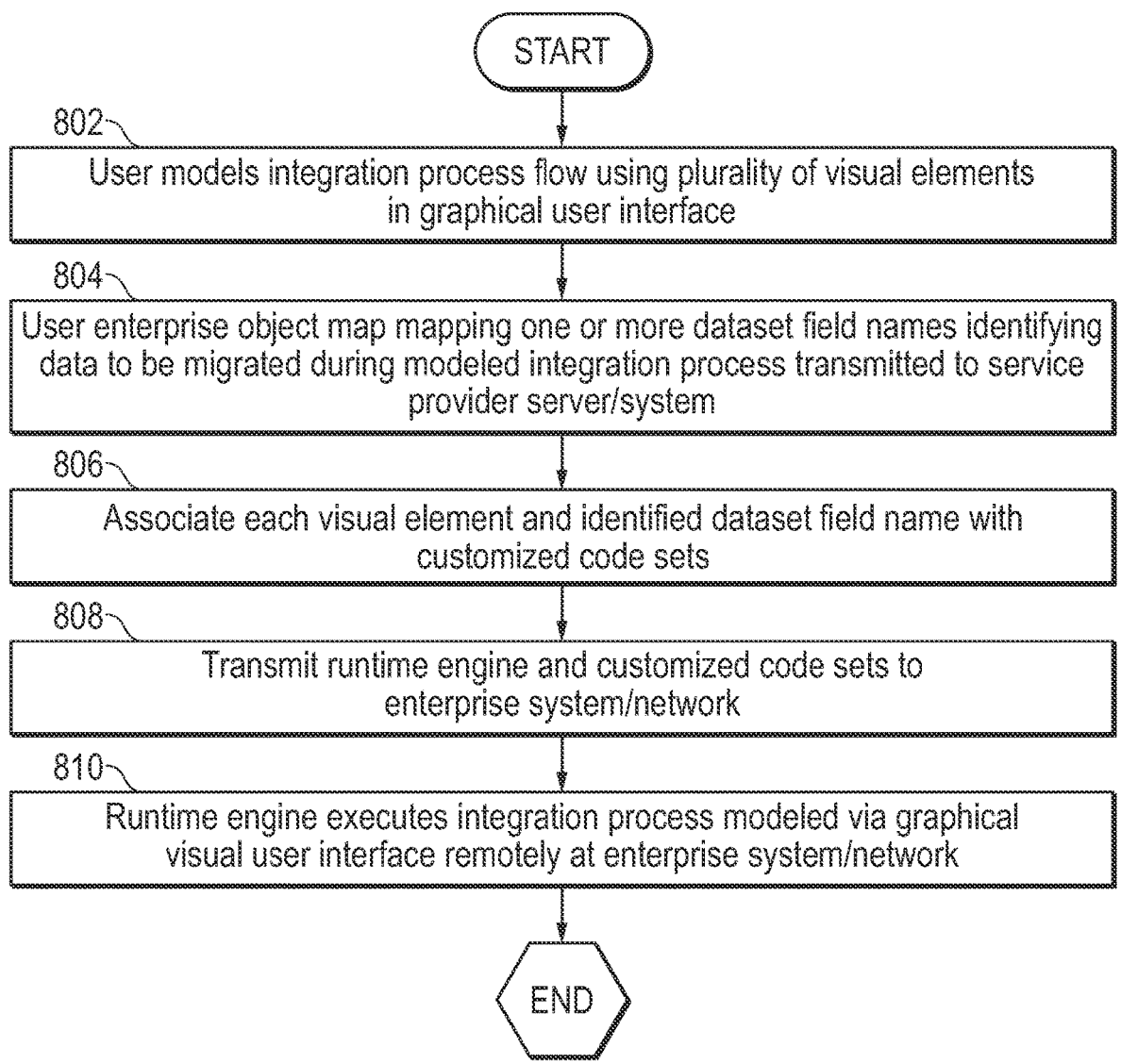
FIG. 8 is a flow diagram illustrating a method of executing a user-modeled integration process according to an embodiment of the present disclosure.

FIG. 8 is a flow diagram illustrating a method of executing a user-modeled integration process for migrating data between a user enterprise system/network and a trading partner according to an embodiment of the present disclosure. As described herein, the service provider system/server in an embodiment may operate to provide three primary functions in an embodiment. First, the service provider system/server may generate an integration application with code instructions for executing a business process data exchange (e.g., integration process) modeled by the user within an enterprise system/network via the integration process modelling GUI. Second, the service provider system/server may identify and automate sales or purchases of datasets via a data marketplace API in an embodiment, as described in greater detail with respect to FIGS. 9 and 10. Third, the service provider system/server in an embodiment may communicate with a payment API or directly with a financial institution for the transfer of electronic funds pursuant to the sale or purchase of datasets by the user via the data marketplace API, as described in greater detail with respect to FIG. 10. The method described with respect to FIG. 8 focuses upon the first of these purposes—generating an integration application with code instructions for executing a business process data exchange modeled by the user.

At block 802, a user may model an integration process flow in an embodiment using a plurality of visual elements in the integration process flow modeling graphical user interface. For example, in an embodiment described with reference to FIG. 3, a user may arrange a plurality of visual elements (e.g., 302, 304, 306, 308, 310, and 312) into an integration process flow via an integration process modeling GUI. Each of the plurality of visual elements in an embodiment may represent a unit of work within an integration process for migrating datasets from one location to another. For example, a start element 302 in an embodiment may identify a dataset to be transmitted from a user enterprise system/network to a trading partner. The dataset defined at the start element 302 in such an embodiment may adhere to a user defined naming schema (e.g., name/value pairing) in which a dataset field name identifies a dataset field value stored at the user enterprise system/network. As another example, a connector element 310 in an embodiment may define a location at which the dataset field value transmitted from the user enterprise system/network will be stored at the trading partner. Further, the connector element 310 may define a dataset field name under which the dataset field value should be stored at the trading partner. As described herein, the dataset field name defined for storage at the user enterprise system/network may be the same or different from the dataset field name defined for storage of the same dataset field value at the trading partner.

A user enterprise object map may be generated in an embodiment at block 804, mapping one or more dataset field names identifying data to be migrated during a user-modeled integration process transmitted to the service provider server/system. For example, in an embodiment described with reference to FIG. 4A, a user may generate the enterprise user object map 410 by directly entering dataset field names corresponding to dataset field values stored at the user enterprise system/network into the object map GUI 400. An enterprise user object map 410 may provide a structure for storage of a plurality of datasets 411 to be migrated pursuant to the user-modeled integration process. Each of the datasets 411 may be identified in the enterprise user object map 410 by their respective dataset field names (e.g., "humidity," "locale," "name," and "ambient_temperature_c"). Such a linked mapping in an embodiment may be accessed and manipulated by the data marketplace transaction identification and enablement system in order to automate identification of opportunities for sale of data migrated pursuant to the user-modeled integration process described at block 802, or opportunities for purchase of similar datasets, as described in greater detail with respect to FIGS. 9 and 10.

An integration application management system in an embodiment may associate each visual element within the user-modeled integration process and dataset field name identified therein with customized code sets at block 806. For example, in an embodiment described with reference to FIG. 3, each process component as represented by the user-selected visual elements discussed at block 802 may be identifiable by a process component type, and may further include an action to be taken. Further the integration process modeling user interface 300 in an embodiment may allow the user to choose the dataset or data element upon which the action will be taken. The action and data element the user chooses may be associated with a connector code set, via the integration application management system, which may be pre-defined and stored at a system provider's memory in an embodiment. In another example, in an embodiment described with reference to FIG. 2, each connector element the user adds to the integration process flow diagram may be associated with a pre-defined subset of code instructions stored at the service provider systems/server 212.

At block 808, the integration application management system in an embodiment may transmit a runtime engine and customized code sets to the enterprise system/network for remote execution. For example, in an embodiment described with reference to FIG. 2, upon the user modeling the integration process, the service provide system/server 212 may generate a run-time engine capable of executing the pre-defined subsets of code instructions represented by the connector integration elements chosen by the user. The service provider system/server 212 in such an embodiment may then transmit the runtime engine and the pre-defined subsets of code instructions to the user enterprise system/network 214.

The runtime engine at the user enterprise system/network in an embodiment at block 810 may execute the integration process modeled via the integration process modeling GUI. For example, in an embodiment described with reference to FIG. 2, the user device 202 or the business process system 204 may engage the runtime engine to execute the subsets of code instructions in the order defined by the modeled flow of the connector integration elements given in the integration process flow diagram, from behind the enterprise system/network firewall 206. Such an execution in an embodiment may trigger the business process data exchange between the enterprise system/network 214 and one or more of trading partner 208, trading partner 210, the cloud-based service provider 218 or the cloud-based enterprise 216, via the network 120. The method may then end.

Figure 9:
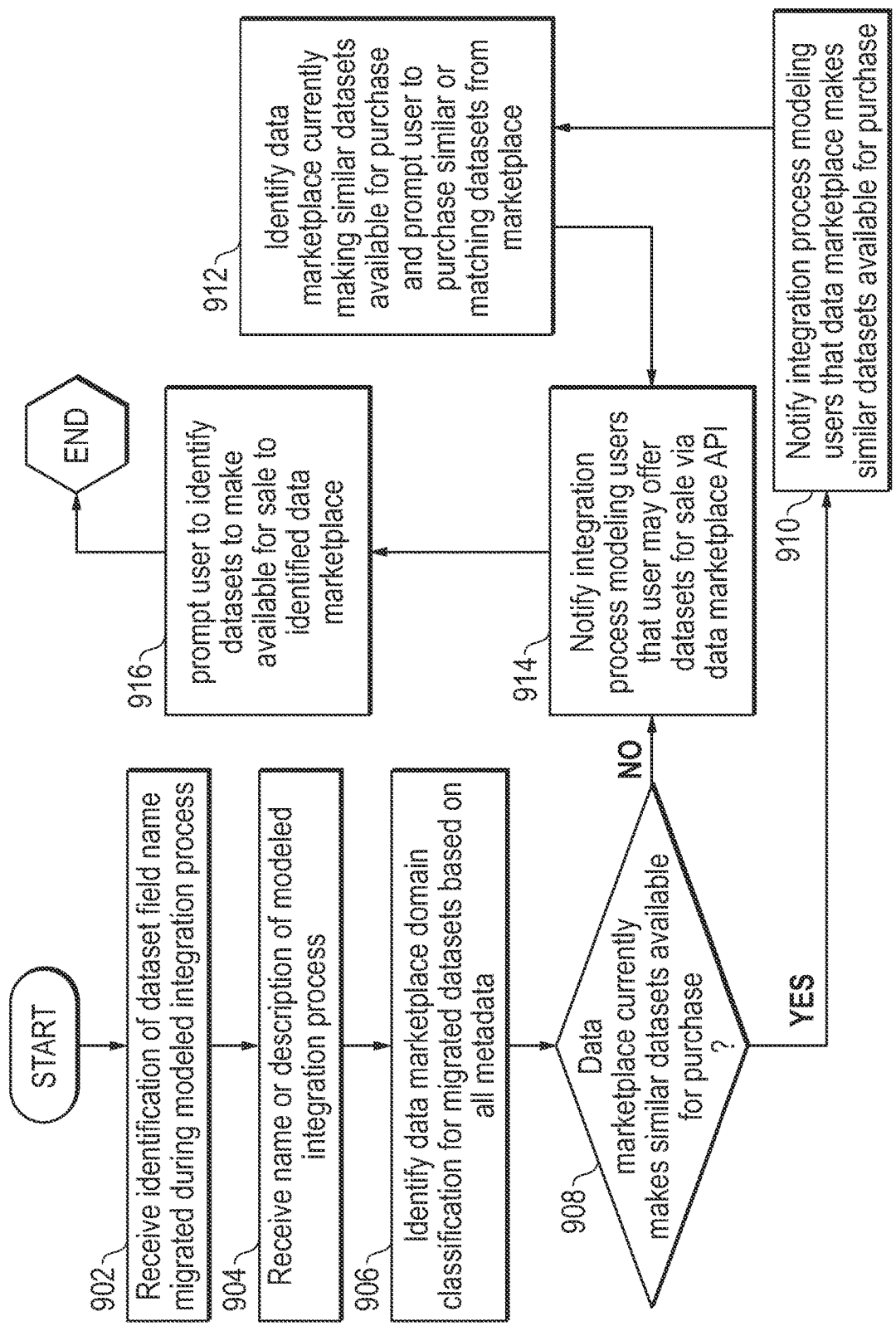
FIG. 9 is a flow diagram illustrating a method of identifying transactional opportunities for datasets migrated within the user-modeled integration process according to an embodiment of the present disclosure.

FIG. 9 is a flow diagram illustrating a method of identifying transactional opportunities for sales or purchasing of datasets migrated within the user-modeled integration process, or similar datasets, according to an embodiment of the present disclosure. As described herein, with the advent of the Internet of Things (IoT), and "big data," the volume of data collected and shared pursuant to modeled, customized integration processes has grown exponentially, and will continue to do so well into the future. When leveraged optimally, such data may be used by various businesses or industries to streamline production, minimize costs, and support other optimization and prediction activities (e.g., predicting consumer trends, or designing hardware maintenance timelines). However, most businesses significantly underutilize the data they gather, much less data available from other businesses. Such underutilization is due in large part to a lack of tools available to quickly and accurately identify, categorize, and access the large volumes of data being transmitted among various businesses. Embodiments of the present disclosure may track the different ways in which such shared data is organized and stored at each of the various businesses during integration processes, and leverage this tracking information to identify opportunities for the sale of such data, or purchasing of similar data through one or more online data marketplaces.

At block 902, the data marketplace transaction identification and enablement system in an embodiment may receive identification of a dataset field name migrated during the user-modeled integration process. As described herein, the service provider system/server in an embodiment may mine the data migrated pursuant to the user-modeled business process data exchange, then communicate with a data marketplace API to determine whether there is a market for the sale of such mined data, or whether data similar to the mined data is available for the purchase by the enterprise system/network. For example, in an embodiment described with reference to FIG. 5, a user may transmit integration process modeling instructions 541 to the integration application management system 532 by using the integration process flow modeling graphical user interface to model a data integration process flow that may be a source for datasets or may indicate types of datasets that may be useful to purchase. As another example, in an embodiment described with reference to FIG. 3, the user may provide integration process modeling instructions by inserting a plurality of visual elements (e.g., 302, 304, 306, 308, 310, and 312), each representing units of work, within a user-modeled user data integration process, modeled by the user via the integration process flow modeling GUI 300. The information provided by the user via such a GUI 300 in an embodiment may be mined, as described directly above, in order to identify datasets migrated pursuant to the integration process modeled via the GUI 300 that may be sold by the user via the data marketplace API, or to identify similar datasets the user may purchase via the data marketplace API.

The user may also transmit a user enterprise object map to the integration application management system via the object model graphical user interface. For example, in an embodiment described with reference to FIG. 4A, a user may generate the enterprise user object map 410, listing each of a plurality of datasets 411 to be migrated pursuant to a user-modeled integration process by directly entering these dataset field names into the object map GUI in some embodiments. In some embodiments, the user may also manually associate one or more dataset field names with a data marketplace domain classification, such as an industry, for example. In other embodiments, the integration application management system may generate the enterprise user object map 410 based on information entered by the user into the integration process modeling graphical user interface during modeling of the integration process that migrates the datasets 411 identified in the enterprise user object map 410.

The data marketplace transaction identification and enablement system in an embodiment may receive the name or description of the modeled integration process at block 904. For example, the name or description of the modeled integration process may be found in metadata associated with the user data integration process modeled via the integration process modeling GUI by the user. As another example, the user may provide the name of the user data integration process migrating the datasets displayed within the enterprise user object map or may add a description of the user data integration process via the object map GUI. In such an embodiment, the name of the user data integration process or the description of such a process may be stored within metadata associated with the enterprise user object map.

At block 906, the data marketplace transaction identification and enablement system in an embodiment may identify a data marketplace domain classification related to the domain or industry within which the migrated datasets may be classified or grouped based on all metadata. The data marketplace transaction identification and enablement system in an embodiment may identify one or more key words within the metadata for the user data integration process or the enterprise user object map, for example, to determine a data marketplace domain classification. The data marketplace transaction identification and enablement system may then input one or more of these keywords into a multi-layered neural network in order to determine a data marketplace domain classification to an industry or domain in which such keywords often appear. A domain, as described herein, may refer to a type of data provider that routinely provides data to data marketplaces for purchase. As such, the data marketplace API in an embodiment may define or categorize datasets into such domains for classification under a data marketplace domain classification.

For example, the data marketplace transaction identification and enablement system in an embodiment may find keywords such as "balance," "saving," "checking," or "financial," within the dataset field names of the enterprise user object map, or within the metadata associated with either the user data integration process or the enterprise user object map. In such an embodiment, the data marketplace transaction identification and enablement system may enter one or more of these identified keywords into a neural network to determine the datasets being migrated pursuant to the user data integration process fall within the banking or financial industry or domain for a data marketplace domain classification. However, data marketplace domain classification may be more or less specific in assessment of classifications in various embodiments. Such datasets may qualify for plural data marketplace domain classifications depending on specificity in embodiments herein. For example, a loan specific data marketplace domain classification or an investing specific data marketplace domain classification may be formed in example embodiments. In other embodiments, data marketplace domain classifications may be particular to specific software or machines, or systems used in an industry, such as financial, aviation, or other industries.

As another example, the data marketplace transaction identification and enablement system in an embodiment may find keywords such as "patient," "ICD9," "health_insurance," or "health provider," within the dataset field names of the enterprise user object map, or within the metadata associated with either the dataset source user data integration process or the enterprise user object map. In such an embodiment, the data marketplace transaction identification and enablement system may enter one or more of these identified keywords into a neural network to determine the datasets being migrated pursuant to the user data integration process fall within the healthcare industry or data marketplace domain classification.

As yet another example, the data marketplace transaction identification and enablement system in an embodiment may find keywords such as "vehicle," "driver," "payload_weight," or "manifest," within the dataset field names of the enterprise user object map, or within the metadata associated with either the user data integration process or the enterprise user object map. In such an embodiment, the data marketplace transaction identification and enablement system may enter one or more of these identified keywords into a neural network to determine the datasets being migrated pursuant to the user data integration process fall within the transportation industry or data marketplace domain classification.

The data marketplace transaction identification and enablement system in an embodiment may determine at block 908 whether a given data marketplace currently makes similar datasets available for purchase. In an embodiment described with reference to FIG. 5, for example, the data marketplace transaction identification and enablement system 526 may access the mapping and linking of various datasets across various locations, as defined within the user enterprise object maps, to identify opportunities for the sale of such datasets, or purchasing of similar datasets through one or more online data marketplaces. For example, the data marketplace transaction identification and enablement system 526 may perform different queries 544 at the data marketplace API 520 for each of the dataset field names or associated data marketplace domain classifications within a user enterprise object map and the user data integration process name, or may perform one or more combined queries 544 of these terms. In some embodiments, the query 544 may involve querying the data marketplace API 520 as to whether it manages data having a data marketplace domain classification within an industry or for particular software, systems, machinery, or the like, as determined at block 906.

The data marketplace API 520 in an embodiment may return query results 545 indicating whether the data marketplace manages datasets similar to the datasets migrated pursuant to the integration process modeled by the user enterprise system/network 514 via the integration application management system 532 such as those with a similar data marketplace domain classification. If the data marketplace does make similar datasets available for purchase, the method may proceed to block 910 to determine whether the user wishes to purchase such similar datasets via the data marketplace API. Indication of similar datasets available for purchase may also indicate that there is an opportunity for the user enterprise system/network to offer its similar datasets for sale via the data marketplace API. If the data marketplace currently does not make similar datasets available for purchase, this may present an opportunity for the user enterprise system/network to offer such datasets for sale via the data marketplace API, and the method may proceed to block 914 to notify the user accordingly.

At block 910, the data marketplace transaction identification and enablement system in an embodiment in which the given data marketplace makes similar datasets available for purchase may notify the integration process modeling user of such purchasing opportunity. For example, in an embodiment described with reference to FIG. 5, if the query results 545 in an embodiment indicate the data marketplace API 520 manages datasets similar to those migrated pursuant to the user-modeled integration process, the data marketplace transaction identification and enablement system 526 may transmit a notification 546 to the user enterprise system/network 514 that an opportunity for the user to purchase data similar to the datasets migrated pursuant to the user-modeled integration process may be available.

As described, a search engine for forming a data marketplace query may utilize keywords or particular industry identifying words from a name, description fields of data categories, or description fields of any other components of a developed business integration process or processes in some example embodiments. Similarly, metadata may be searched within a business integration process profile, such as a Boomi profile, for definitions of Boomi integration process utilization in some embodiments. With the above data, such as the found word terms or metadata, one or more artificial intelligence services, such as third party services like Amazon Web Services® Comprehend or others, may be used to identify an industry or domain that applies. The analysis of the names and metadata may include a domain that may be fed into a query at a data marketplace. For example, query results 545 in an embodiment may indicate the data marketplace API 520 manages datasets with a field name "temperature_C," which may be similar to datasets migrated pursuant to the user-modeled integration process having a field name "temperature_F." As another example, query results 545 in an embodiment may indicate the data marketplace API 520 manages datasets determined to fall within a data marketplace domain classification "health," which may be determined to be similar to datasets falling within the data marketplace domain classification "medical." As described herein, when leveraged optimally, such data may be used by various businesses or industries to streamline production, minimize costs, and support other optimization and prediction activities (e.g., predicting consumer trends). Purchasing datasets available via data marketplaces in an embodiment may, for example, allow the user enterprise system/network 514 to more accurately model maintenance timelines for machinery, by basing those models on richer, fuller datasets than those gathered directly by the user enterprise system/network 514. As described, querying of one or more known data marketplaces may occur in these steps.

The data marketplace transaction identification and enablement system at block 916 may identify the data marketplace currently making similar datasets available for purchase and prompt the user to identify one or more similar or matching datasets she wishes to purchase from the data marketplace. For example, in an embodiment described with reference to FIG. 5, the notification 546 may include an identification of the data marketplace API 520. The notification 546 in such an embodiment may further prompt the user to initiate an automated purchase process for similar datasets available for purchase from the data marketplace API 520, or for the user to indicate she does not wish to engage in such a purchase. In such an embodiment, the user may indicate an account with a financial institution or a third party funds transfer application (e.g., Venmo™) from which the user's electronic funds may be withdrawn in order to complete the purchase.

For example, the data marketplace transaction identification and enablement system in an embodiment described with reference to FIG. 4 may determine one or more of the dataset field names provided within the enterprise user object map 410 match datasets managed by the data marketplace API, list each of those matching dataset field names, and prompt the user to select one or more that she may wish to purchase via the data marketplace API. In another embodiment described with reference to FIG. 6B, the data marketplace transaction identification and enablement system may map one or more links between each of the matching datasets managed by the data marketplace API and the corresponding datasets managed by the user enterprise system/network within the enterprise user object map 610. For example, in some embodiments, the data marketplace transaction identification and enablement system may determine datasets within the data marketplace object map match the datasets within the enterprise user object map 610 because each of these matching datasets fall within the same or similar data marketplace domain classifications. The data marketplace transaction identification and enablement system may then prompt the user to select one or more of these datasets for purchase by selecting the corresponding dataset within the enterprise user object map 610. For example, the user may select to purchase datasets managed by the data marketplace API corresponding to or matching datasets 612, 613, 614, and 615. In some embodiments, those purchased datasets may be delivered to the user at specific locations. The method in embodiments in which the data marketplace currently makes datasets similar to those migrated within the user-modeled integration process available for purchase may then proceed to block 914 to notify the user of opportunities for sale of datasets migrated pursuant to the user-modeled integration process.

At block 914, the data marketplace transaction identification and enablement system may notify the integration process modeling user that the user may have an opportunity to offer such datasets for sale via the data marketplace API. This may occur in an embodiment in which the data marketplace does not currently make datasets similar to those migrated within the user-modeled integration process available for purchase, or in an embodiment in which the user has an opportunity to initiate the purchase of similar datasets. In embodiments in which the data marketplace transaction identification and enablement system has determined, through querying the data marketplace API, that the data marketplace API offers for sale datasets similar to the datasets migrated pursuant to the user-modeled integration process, it may be determined that the data marketplace API provides a market in which the datasets migrated pursuant to the user-modeled integration process may also be sold.

For example, in an embodiment described with respect to FIG. 5, if the query results 545 in an embodiment indicate the data marketplace API 520 does not manage any similar datasets, the data marketplace transaction identification and enablement system 526 may transmit a notification 546 to the user enterprise system/network 514 that an opportunity for sale of one or more datasets migrated pursuant to the user-modeled integration process may be available. A GUI may prompt a user to verify or permit sales in example embodiments for security or transaction purposes.

The data marketplace transaction identification and enablement system in an embodiment at block 916 may identify the data marketplace not currently making similar datasets available for purchase, and prompt the user to identify one or more datasets to make available for sale via the identified data marketplace API. For example, in an embodiment described with reference to FIG. 5, the notification 546 may identify the data marketplace API 520, and may further include a prompt for the user to initiate an automated sales process of datasets, or to indicate she does not wish to engage in such a sale.

As another example, in an embodiment described with reference to FIG. 6A, the data marketplace transaction identification and enablement system may display the user enterprise object map 610, and prompt the user to select one or more of the datasets 611 the user may wish to sell via the data marketplace API. In an example embodiment, the user may select the dataset 612 having the dataset field name "humidity," dataset 613 having the dataset field name "locale," dataset 614 having the dataset field name "name," or dataset 615 having the dataset field name "ambient_temperature_c." Such datasets may be offered under a data marketplace domain classification and delivered via the data marketplace API for a purchaser in an embodiment. The method in embodiments in which the data marketplace currently does not make datasets similar to those migrated within the user-modeled integration process available for purchase may then end.

FIG. 10 is a flow diagram illustrating a method of automatically enabling sales or purchase of datasets migrated within the user-modeled integration process, or similar datasets, according to an embodiment of the present disclosure. The data marketplace transaction identification and enablement system may automatically generate and execute a new dataset sales integration process or dataset purchase integration process to facilitate user-selected sales or purchases.

At block 1002, the data marketplace transaction identification and enablement system in an embodiment may receive a user instruction to initiate a transaction with the data marketplace vendor for the user-identified dataset. For example, in an embodiment described with reference to FIG. 7A, the data marketplace transaction identification and enablement system 726 in an embodiment in which the user wishes to sell data may receive a user instruction 741 to sell specifically identified datasets via the data marketplace. As another example, in an embodiment described with reference to FIG. 7B, the data marketplace transaction identification and enablement system 726 in an embodiment in which the user wishes to purchase data may receive a user instruction 751 to purchase specifically identified datasets via the data marketplace. The specific identification of such datasets in an embodiment may be datasets that match datasets or dataset marketplace domain classifications as determined and compared in the embodiment of FIG. 9. Instruction may be received from a user in blocks 916 (e.g., user instruction to sell datasets) and 912 (e.g., user instruction to purchase datasets) of FIG. 9.

The data marketplace transaction identification and enablement system in an embodiment at block 1004 may map the dataset field names defined in the enterprise user object map to dataset field names in the data marketplace API object map. For example, in an embodiment described with reference to FIG. 7A, the data marketplace transaction identification and enablement system 726 may determine the location, structure, and schema for storage of the datasets to be offered for sale via the data marketplace API 720. The data marketplace transaction identification and enablement system 726 in such an embodiment may also determine the location at which the user enterprise system/network 714 stores the datasets offered for sale, and structure or schema for such storage.

For example, in an embodiment described with reference to FIG. 6B, the data marketplace transaction identification and enablement system in an embodiment may automatically generate an enterprise user object map and data marketplace object map, and link various datasets within these maps together. The data marketplace transaction identification and enablement system in an embodiment may, for example, generate the data marketplace object map 630 in an embodiment by querying the data marketplace API, or by referencing documentation defining the storage schema for datasets associated with the data marketplace API. In another embodiment, the business integration process application development platform, such as Boomi, may track a large number of mappings of previously conducted business integration processes developed on the platform. With these mappings indexed, these unique mappings may number in the millions or more. Utilizing crowd-sourcing of the metadata of all these unique mappings may be utilized with a suggest engine to offer suggestions and dynamic creation generate an enterprise user object map and data marketplace object map, and link various datasets within these maps together based on the best discovered fit.

Once the user in an embodiment has selected datasets within the user enterprise object map that she wishes to sell (e.g., datasets having dataset field names such as "humidity" 612, "locale" 613, "name" 614, and "ambient_temperature_c" 615, or falling within a specific data marketplace domain classification such as "smart home"), or identifies one or more datasets within the data marketplace object map she wishes to purchase, the data marketplace transaction identification and enablement system may map various links. For example, the dataset marketplace API documentation may require location data to be stored under the dataset field name such as "location," rather than "locale," as used by the user enterprise system/network. Thus, the dataset marketplace transaction identification and enablement system in such an embodiment may map link 643 between the enterprise user dataset field name such as "locale" 613 and the data marketplace dataset field name "location" 633. In some embodiments, both the dataset field name under which the data marketplace API requires the dataset field value to be stored falls within the same data marketplace domain classification as the dataset field name under which the dataset field value is stored by the enterprise user. For example, the dataset field name "location" 633 within the data marketplace object map and the dataset "locale" 613 within the user enterprise object map 610 may fall within the same data marketplace domain classification "smart home." In such a way, the data marketplace transaction identification and enablement system may identify the dataset field name under which a user-identified dataset offered for sale by the user may be stored via the data marketplace API, or identify the dataset field name under which a dataset the user wishes to purchase from the data marketplace API may be stored at the user enterprise system/network.

At block 1006, the data marketplace transaction identification and enablement system in an embodiment may determine whether the user wishes to buy or sell datasets (e.g., datasets falling within the same data marketplace domain classification). For example, in an embodiment described with reference to FIG. 7A, the user enterprise system/network 714 may transmit a user instruction 741 to the data marketplace transaction identification and enablement system 726, indicating the user wishes to sell datasets to the data marketplace API 720. In another example, in an embodiment described with reference to FIG. 7B, the user enterprise system/network 714 may transmit a user instruction 751 to the data marketplace transaction identification and enablement system 726, indicating the user wishes to purchase datasets from the data marketplace API 720. If the user selects one or more datasets she wishes to offer for sale in an embodiment, the method may proceed to block 1008 for automation of a dataset sales integration process executing such a sale. If the user selects one or more datasets she wishes to purchase from the data marketplace, the method may proceed to block 1014 for automation of a dataset purchase integration process executing such a purchase.

At block 1008, in an embodiment in which the user has identified datasets she wishes to sell, the data marketplace transaction identification and enablement system may generate a dataset sales integration process. Such a dataset sales integration process in an embodiment may model a process for transmitting a user-specified dataset from a location defined in the user data integration process to a location defined by the data marketplace API. For example, in an embodiment described with reference to FIG. 7A, the data marketplace transaction identification and enablement system 726 in an embodiment may model a dataset sales integration process having a start visual element that identifies the dataset managed by the user enterprise system/network 714 and selected by the user for sale, using the user-defined storage schema or dataset field naming convention. The same dataset sales integration process in such an embodiment may also include a connector visual element, for example, that identifies the dataset field name and location under which the dataset field value associated with the user-managed dataset offered for sale may be stored via the data marketplace API 720. Each of these visual elements may then be associated with code instructions generated by the integration application management system and a dataset purchase API generated for remote execution of the data transaction integration process. The method for embodiments in which the user identifies datasets she wishes to sell may then proceed to block 1012 for registration of an automatically generated dataset sales API to execute or facilitate a dataset sales integration process with the data marketplace API.

In an embodiment in which the user has identified datasets she wishes to purchase, the data marketplace transaction identification and enablement system at block 1010 may generate a dataset purchase integration process. Such a dataset purchase integration process in an embodiment may model a process for transmitting a matching dataset (e.g., falling within the same or similar data marketplace domain classification) from a location defined by the data marketplace API to a location defined in a user-modeled data integration process involving similar datasets. For example, in an embodiment described with reference to FIG. 7B, the data marketplace transaction identification and enablement system 726 in an embodiment may model a dataset purchase integration process having a start visual element that identifies the dataset field name and location under which the dataset field value offered for purchase may be stored by the data marketplace API 720, and a connector visual element that identifies the location and dataset field name within the user enterprise system/network 714 under which such a purchased dataset may be stored. Each of these visual elements may then be associated with code instructions generated by the integration application management system and a dataset purchase API generated for remote execution of the dataset purchase integration process. The method for embodiments in which the user identifies datasets she wishes to purchase may then proceed to block 1012 for registration of an automatically generated dataset purchase API executing or facilitating a dataset purchase integration process with the data marketplace API.

At block 1014, the data marketplace transaction identification and enablement system in an embodiment may register an automatically generated dataset sales API or automatically generated dataset purchase API to the data marketplace API for execution or facilitation of a dataset sales integration process or a dataset purchase integration process. For example, in an embodiment described with reference to FIG. 7A, in which the user wishes to sell datasets, the data marketplace transaction identification and enablement system 726 may transmit the dataset sale API 742 (e.g., as generated at block 1008) and supporting documentation 743 to the data marketplace API 720. As another example, in an embodiment described with reference to FIG. 7B, in which the user wishes to purchase datasets, the data marketplace transaction identification and enablement system 726 may transmit the dataset purchase API 752 (e.g., as generated at block 1010) and supporting documentation 753 to the data marketplace API 720. The data marketplace API 720 may require such registration and access to supporting documentation in order to transact business with either the dataset sales API 742 or the dataset purchase API 752 during execution or facilitation of a dataset sales integration process or a dataset purchase integration process in an embodiment.

The dataset sales API in an embodiment may automatically initiate transfer of datasets pursuant to a user-defined sale, or the dataset purchasing API may automatically initiate transfer of datasets pursuant to a user-defined purchase at block 1018. The transfer of sold or purchased datasets may occur pursuant to execution or facilitation of a dataset sales integration process or a dataset purchase integration process. For example, in an embodiment described with reference to FIG. 7A, the API 720 may automatically engage the dataset sale API 742 to execute the underlying dataset sales integration process. In such an embodiment, the dataset sale API 742 may execute the underlying dataset sales integration process, causing the sold datasets 745 to be transmitted automatically, without any user intervention, from the user enterprise system/network 714 to the data marketplace API 720. In such a way, the data marketplace transaction identification and enablement system may automatically identify opportunities for sales of user-managed datasets determined from source user-modeled integration process operations and enable such sales. The method in embodiments in which the user wishes to sell datasets may then end.

As another example, in an embodiment described with reference to FIG. 7B, the API 720 may automatically engage the dataset purchase API 742 to execute the underlying dataset purchase integration process. In such an embodiment, the dataset purchase API 742 may execute the underlying dataset purchase integration process, causing the purchased datasets 755 to be transmitted automatically, without any user intervention, from the data marketplace API 720 to the user enterprise system/network 714. In such a way, the data marketplace transaction identification and enablement system may automatically identify opportunities for purchase of datasets similar to user-managed datasets and enable such purchases. The method in embodiments in which the user wishes to purchase datasets may then end.

The blocks of the flow diagrams 8-10 discussed above need not be performed in any given or specified order and may be executed as code instructions at one or a plurality of processors during preparation and set up of a modeled integration process or of a deployed integration process as described herein. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating data marketplace transaction identification and enablement system comprising:
   a processor receiving an enterprise user object map defining a plurality of dataset field names and storage locations for a plurality of datasets to be migrated pursuant to a user data integration process modeled by a user with a plurality of visual elements via a process modeling graphical user interface;
   the processor identifying a data marketplace domain classification among the plurality of datasets to be migrated based on the enterprise user object map;
   the processor querying, via a network interface device, a data marketplace application programming interface (API) for datasets meeting the data marketplace domain classification and available for sale;
   the processor generating a dataset sale integration process for transmitting one of the plurality of datasets with the data marketplace domain classification for sale from a storage location defined by the dataset sale integration process to a purchaser location; and
   the dataset sales integration process automatically transmitting the one of the plurality of datasets of the data marketplace domain classification for sale to the purchaser location.

2. The information handling system of claim 1 further comprising:
   the processor determining the data marketplace domain classification via a neural network based on metadata associated with the user enterprise object map.

3. The information handling system of claim 2, wherein the metadata associated with the user enterprise object map comprises an identification of the user data integration process, and metadata associated with the user data integration process.

4. The information handling system of claim 1 further comprising:
an object mapping graphical user interface prompting the user to identify one or more of the plurality of datasets within the user enterprise object map to offer for sale via the data marketplace API; and
the network interface device transmitting identification of the data marketplace domain classification and identification of one or more of the plurality of datasets selected for sale by the user to the data marketplace API.

5. The information handling system of claim 1 further comprising:
the dataset sales integration process generating a dataset sale API to expedite communication with the data marketplace API with a standardized dataset naming schema for generating a data marketplace object map.

6. The information handling system of claim 1 further comprising:
the processor linking one of the plurality of datasets selected by the user for sale within the enterprise user object map to a data marketplace dataset falling within the data marketplace domain classification within the data marketplace object map.

7. The information handling system of claim 6 further comprising:
the processor performing a user-specified function to convert a user dataset field value associated with a dataset to be migrated that is listed within the enterprise user object map to a marketplace dataset field value associated with a dataset having a dataset marketplace domain classification that is listed within the data marketplace object map.

8. A method of identifying and enabling a data marketplace system transaction comprising:
receiving, via a processor, an enterprise user object map defining a plurality of dataset field names and storage locations for a plurality of datasets to be migrated pursuant to a user data integration process modeled by a user with a plurality of visual elements via a process modeling graphical user interface;
identifying, via the processor, a data marketplace domain classification for at least one of the plurality of datasets to be migrated based on the enterprise user object map;
querying, via a network interface device, a data marketplace application programming interface (API) to determine that at least one of the plurality of datasets to be migrated meets the data marketplace domain classification;
generating a dataset sale integration process for transmitting the at least one of the plurality of datasets with the data marketplace domain classification selected by the user as being for sale from a storage location defined by the user data integration process to a location defined by the data marketplace API; and
automatically transmitting the at least one of the plurality of datasets with the data marketplace domain classification selected by the user as being for sale to a purchaser.

9. The method of claim 8 further comprising:
determining the data marketplace domain classification via a neural network and based on metadata associated with the user enterprise object map.

10. The method of claim 9, wherein the metadata associated with the user enterprise object map comprises metadata associated with the user data integration process and a user-defined description of the user data integration process.

11. The method of claim 8 further comprising:
transmitting an identification of the data marketplace domain classification and an identification of one or more of the plurality of datasets selected for sale by the user to the data marketplace API via the network interface device.

12. The method of claim 8 further comprising:
prompting the user, via an object mapping graphical user interface, to identify one or more of the plurality of datasets within the user enterprise object map to offer for sale to the data marketplace API.

13. The method of claim 8 further comprising:
receiving, via the network interface device, a data marketplace API standardized dataset naming schema for generating a data marketplace object map;
linking the one of the plurality of datasets selected by the user for sale within the enterprise user object map to a data marketplace dataset falling within the data marketplace domain classification within the data marketplace object map; and
registering a dataset sales API to operate with the data marketplace API.

14. The method of claim 8 further comprising:
performing a user-specified function to convert a user dataset field value associated with the least one of the plurality of datasets to be migrated as listed within the enterprise user object map to a marketplace dataset field value having a dataset marketplace domain classification as listed within a data marketplace object map.

15. An information handling system operating data marketplace transaction identification and enablement system comprising:
a processor receiving an enterprise user object map defining a plurality of dataset field names and storage locations for a plurality of datasets to be migrated pursuant to a user data integration process modeled by a user with a plurality of visual elements via a process modeling graphical user interface;
the processor identifying a data marketplace domain classification for a portion of the plurality of datasets to be migrated based on the enterprise user object map;
a processor querying a data marketplace application programming interface (API) via a network interface device to determine that the data marketplace API provides at least one dataset meeting the data marketplace domain classification; and
the processor automatically transmitting with a generated dataset purchase integration process for transmitting at least one dataset of the plurality of datasets of the data marketplace domain classification selected for purchase from a location defined by the data marketplace API to a storage location defined in the user data integration process.

16. The information handling system of claim 15 further comprising:
the processor determining the data marketplace domain classification via a neural network and based on metadata associated with the user enterprise object map.

17. The information handling system of claim 16, wherein the metadata associated with the user enterprise object map comprises an identification of the user data integration process.

18. The information handling system of claim 15 further comprising:

the processor linking a data marketplace dataset falling within the data marketplace domain classification within a data marketplace object map and selected for purchase to a dataset within the enterprise user object map.

19. The information handling system of claim 15 further comprising:

the network interface device transmitting identification of a data marketplace dataset falling within the data marketplace domain classification and selected for purchase to the data marketplace API; and the network interface device registering a dataset purchasing API for automatic execution of the generated dataset purchase integration process with a data marketplace vendor.

20. The information handling system of claim 15 further comprising:

the processor performing a user-specified function to convert a user dataset field value associated with the at least one dataset meeting the data marketplace domain classification to be migrated to a marketplace dataset field value associated the dataset marketplace domain classification as listed within a data marketplace object map.

\* \* \* \* \*